(12) United States Patent
Futa et al.

(10) Patent No.: US 7,917,764 B2
(45) Date of Patent: Mar. 29, 2011

(54) SIGNATURE GENERATION DEVICE AND SIGNATURE VERIFICATION DEVICE

(75) Inventors: Yuichi Futa, Osaka (JP); Shingo Hasegawa, Miyagi (JP); Shuji Isobe, Miyagi (JP); Motoji Ohmori, Osaka (JP); Hiroki Shizuya, Miyagi (JP)

(73) Assignee: Panasonic Corporation, Osaka (JP)

( * ) Notice: Subject to any disclaimer, the term of this patent is extended or adjusted under 35 U.S.C. 154(b) by 916 days.

(21) Appl. No.: 11/795,871

(22) PCT Filed: Jan. 17, 2006

(86) PCT No.: PCT/JP2006/300510
§ 371 (c)(1),
(2), (4) Date: Jul. 24, 2007

(87) PCT Pub. No.: WO2006/077822
PCT Pub. Date: Jul. 27, 2006

(65) Prior Publication Data
US 2008/0222418 A1 Sep. 11, 2008

(30) Foreign Application Priority Data
Jan. 24, 2005 (JP) .................. 2005-015162

(51) Int. Cl.
*H04L 9/00* (2006.01)
(52) U.S. Cl. ............ 713/176; 380/30; 380/278; 713/168
(58) Field of Classification Search .................. 713/176, 713/168; 380/30, 45, 278
See application file for complete search history.

(56) References Cited

U.S. PATENT DOCUMENTS

| | | | |
|---|---|---|---|
| 6,081,597 | A | 6/2000 | Hoffstein et al. |
| 6,212,097 | B1 | 4/2001 | Kihara et al. |
| 6,262,915 | B1 | 7/2001 | Kihara et al. |
| 6,601,140 | B1 | 7/2003 | Okaue et al. |
| 6,618,789 | B1 | 9/2003 | Okaue et al. |
| 6,691,149 | B1 | 2/2004 | Yokota et al. |

(Continued)

FOREIGN PATENT DOCUMENTS

CN 1245311 2/2000

(Continued)

OTHER PUBLICATIONS

Hasegawa et al., "A Countermeasure for Protecting NTRUSign against the Transcript Attack", *Symposium on Cryptography and Information Security*, vol. 11, pp. 943-947, Jan. 2005 (including English translation).

(Continued)

*Primary Examiner* — Kimyen Vu
*Assistant Examiner* — Baotran N To
(74) *Attorney, Agent, or Firm* — Wenderoth, Lind & Ponack, L.L.P.

(57) ABSTRACT

A signature generation apparatus capable of preventing transcript attack on signature data is provided. The signature generation apparatus performing a digital signature operation with the use of a signature key: stores the signature key; performs the digital signature operation on signature target data with the use of the signature key to generate signature data; counts the cumulative count of digital signature operations having been performed by the signature generation unit with the use of the signature key; judges whether the cumulative count has reached a predetermined count; and inhibits the use of the signature key in the digital signature operation from then onward in a case where the judgment unit determines that the cumulative count has reached the predetermined count.

16 Claims, 9 Drawing Sheets

U.S. PATENT DOCUMENTS

| | | |
|---|---|---|
| 6,711,685 B1 | 3/2004 | Schaal et al. |
| 6,792,539 B1 | 9/2004 | Oishi et al. |
| 6,799,273 B1 | 9/2004 | Oishi et al. |
| 6,807,024 B1 | 10/2004 | Yokota et al. |
| 6,820,203 B1 | 11/2004 | Okaue et al. |
| 6,839,841 B1 | 1/2005 | Medvinsky et al. |
| 6,892,308 B1 | 5/2005 | Medvinsky |
| 6,985,584 B1 | 1/2006 | Yokota et al. |
| 7,089,271 B1 | 8/2006 | Kihara et al. |
| 7,167,561 B1 | 1/2007 | Kihara et al. |
| 7,376,837 B1 | 5/2008 | Medvinsky |
| 2001/0011267 A1 | 8/2001 | Kihara et al. |
| 2002/0073311 A1 | 6/2002 | Futamura et al. |
| 2003/0120604 A1 | 6/2003 | Yokota et al. |
| 2004/0051805 A1 | 3/2004 | Yoshikawa et al. |
| 2004/0218214 A1 | 11/2004 | Kihara et al. |
| 2005/0027985 A1 | 2/2005 | Sprunk et al. |
| 2005/0060540 A1 | 3/2005 | Okaue et al. |
| 2005/0120248 A1 | 6/2005 | Medvinsky |
| 2005/0158024 A1 | 7/2005 | Kihara et al. |
| 2005/0162754 A1 | 7/2005 | Yoshikawa et al. |
| 2005/0162755 A1 | 7/2005 | Yoshikawa et al. |
| 2005/0174426 A1 | 8/2005 | Yoshikawa et al. |
| 2005/0175318 A1 | 8/2005 | Kihara et al. |
| 2005/0180729 A1 | 8/2005 | Kihara et al. |
| 2005/0191029 A1 | 9/2005 | Kihara et al. |
| 2006/0029230 A1 | 2/2006 | Kihara et al. |
| 2006/0095381 A1 | 5/2006 | Yokota et al. |
| 2009/0323954 A1 | 12/2009 | Sprunk et al. |

FOREIGN PATENT DOCUMENTS

| | | | |
|---|---|---|---|
| CN | 1267157 | | 9/2000 |
| JP | 2000-305995 | | 11/2000 |
| JP | 2000-516733 | | 12/2000 |
| JP | 2002-535740 | | 10/2002 |
| JP | 2002-335237 | | 11/2002 |
| JP | 2004-080174 | * | 3/2004 |
| JP | 2004-80174 | | 3/2004 |
| WO | 00/45241 | | 8/2000 |
| WO | 03/050998 | | 6/2003 |

OTHER PUBLICATIONS

Hasegawa et al., "A Countermeasure for Protecting NTRUSign against the Transcript Attack", *Symposium on Cryptography and Information Security*, vol. 11, pp. 943-947, Jan. 2005.

Hoffstein et al., "NTRU: A Ring-Based Public Key Cryptosystem", *Lecture Notes in Computer Science*, vol. 1423, pp. 267-288, 1998.

Hoffstein et al., "NSS: An NTRU Lattice-Based Signature Scheme", *Eurocrypt*, vol. 2045, pp. 123-137, 2001.

Hoffstein et al., "NTRUSign: Digital Signatures Using the NTRU Lattice", *CT-RSA '03*, vol. 2612, pp. 122-140, 2003.

\* cited by examiner

FIG. 6
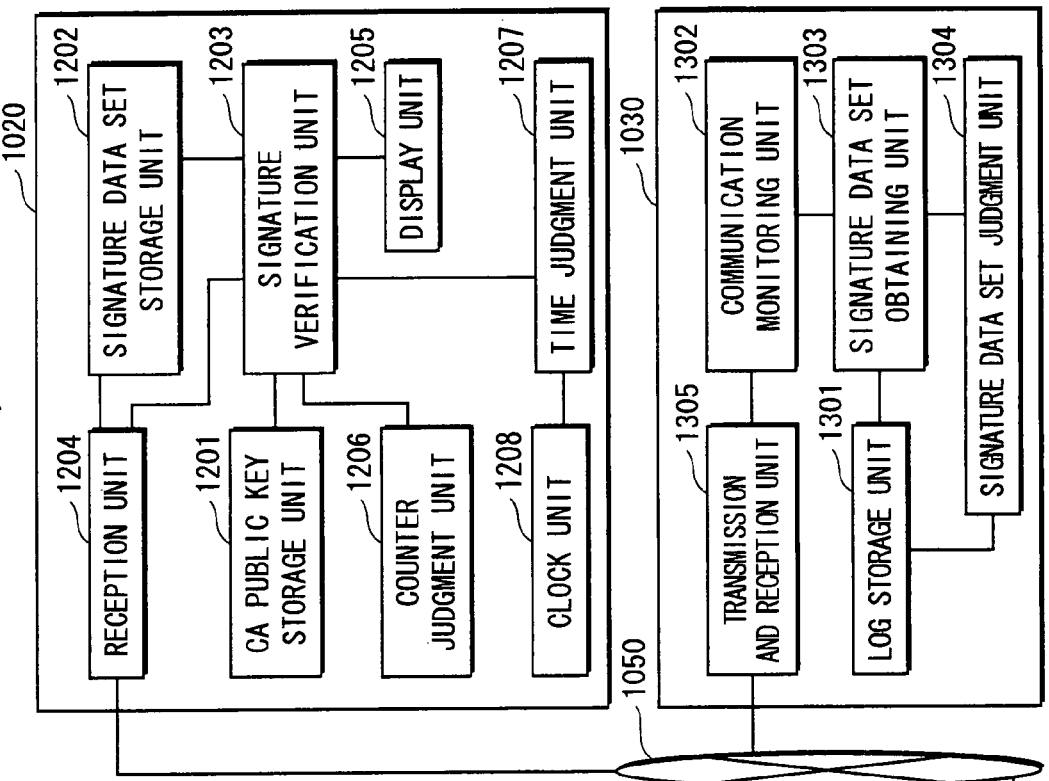
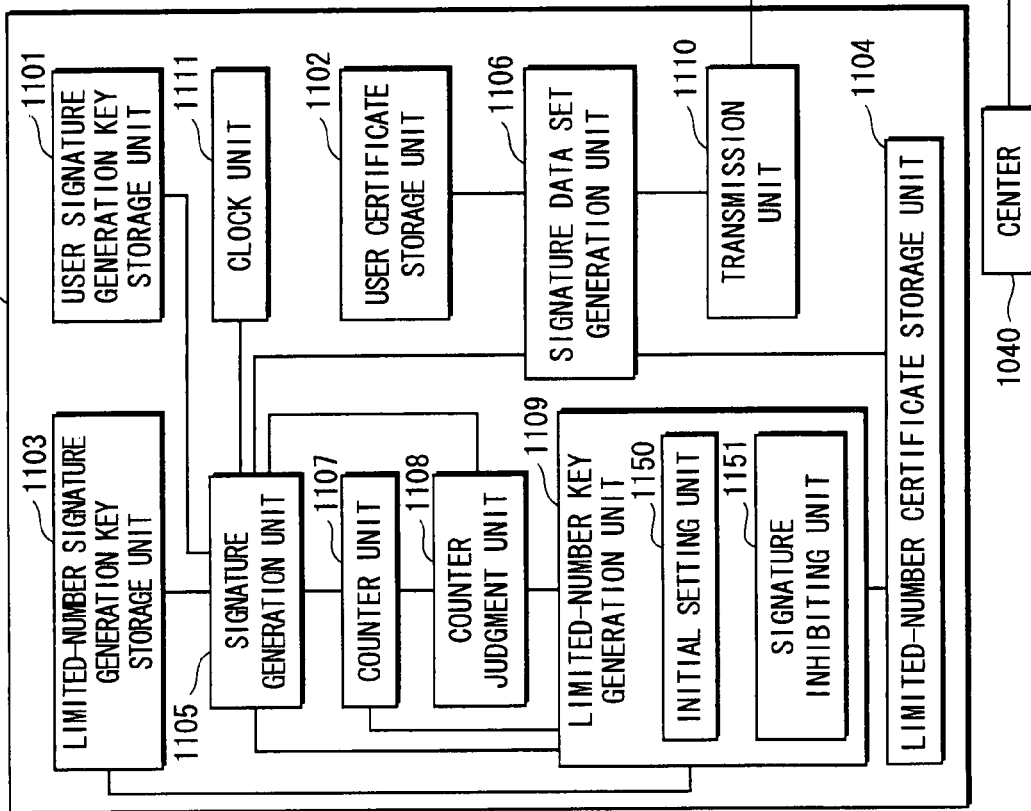

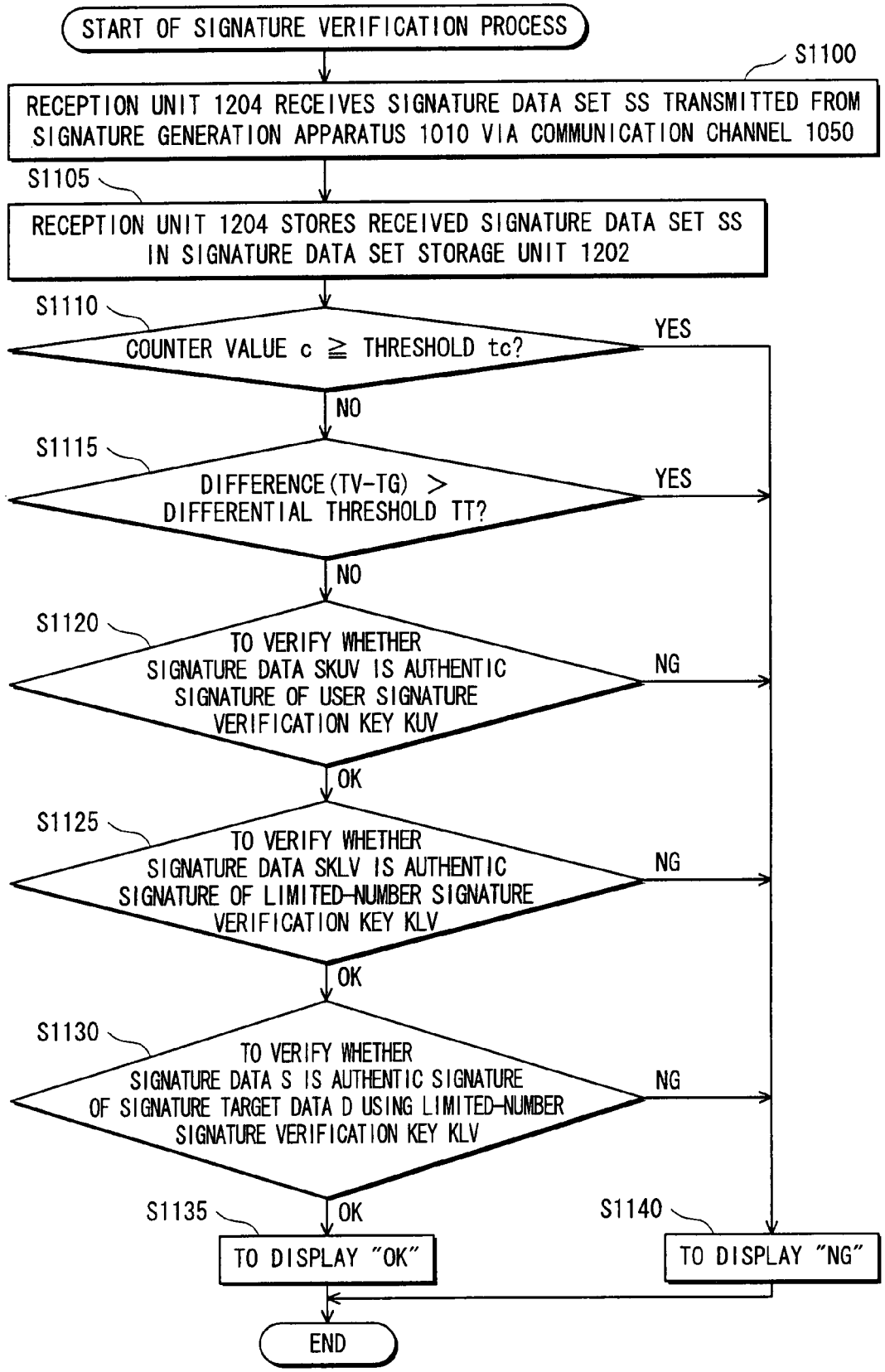

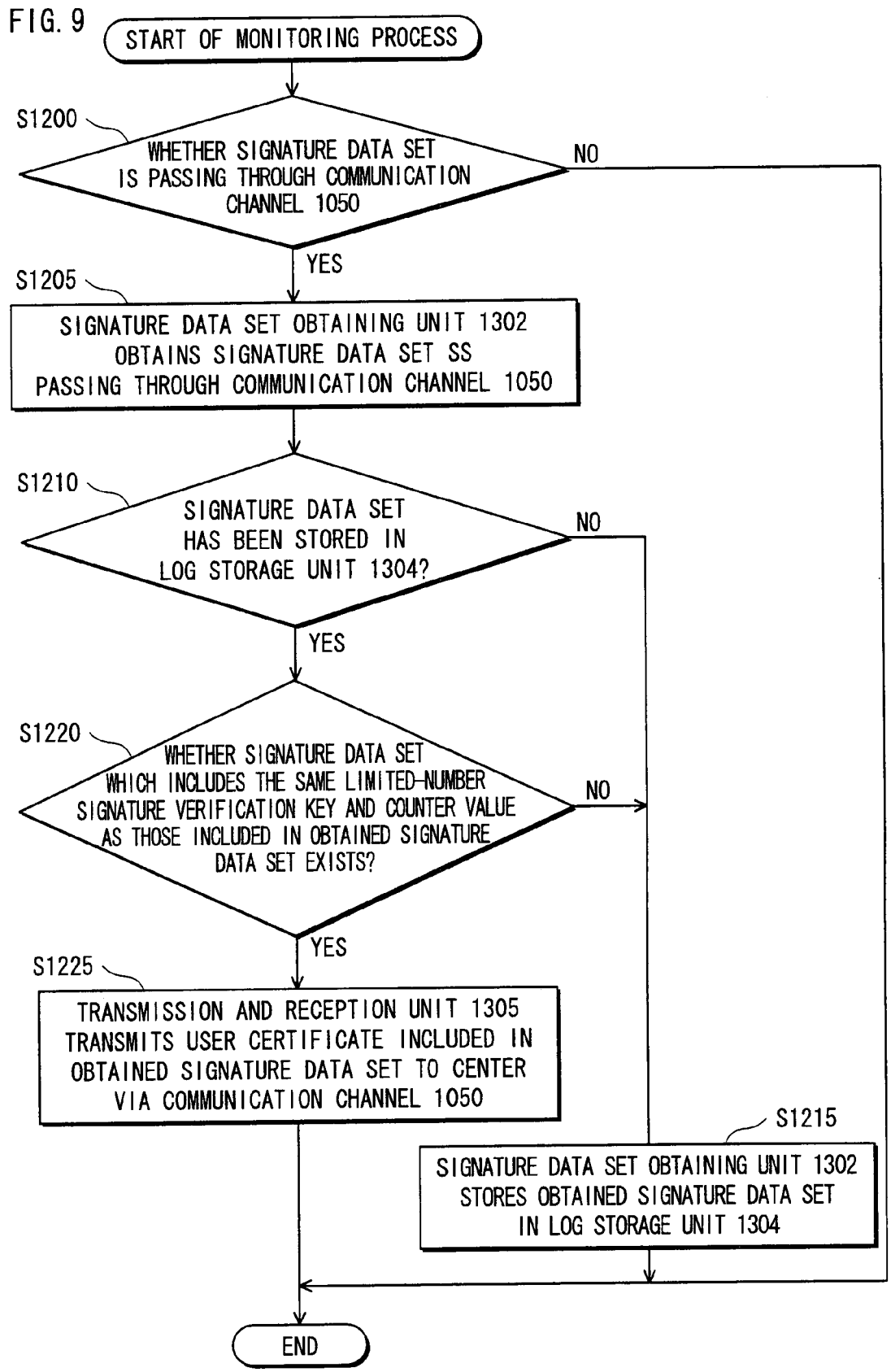

SIGNATURE GENERATION DEVICE AND SIGNATURE VERIFICATION DEVICE

TECHNICAL FIELD

The present invention relates to encryption technology used for information security, in particular to digital signature technology.

BACKGROUND ART

Digital signature schemes that are a type of public-key encryption are technology used for identifying a sender and preventing data falsification when data is sent from a receiving apparatus to a transmitting apparatus. To explain the schemes simply, the transmitting apparatus creates signature data for data desired to be transmitted using a private key of the transmitting apparatus, and then transmits the signature data to the receiving apparatus together with the desired data. The receiving apparatus performs a verification of the signature data using a public key corresponding to the private key of the transmitting apparatus to judge whether the desired data has been falsified (see Non-Patent Reference 1, for example). Here, it is difficult to calculate a value of the private key from the public key.

Recently, the NTRU encryption is proposed as a public-key encryption enabling high-speed processing (e.g. Non-Patent Reference 2). The NTRU encryption performs encryption and decryption by polynomial operations that can be implemented at higher speeds, as compared to RSA encryption that carries out modulo exponentiation under a certain rule and an elliptic curve cryptosystem that performs scalar multiplication for points on an elliptic curve. Hence, the NTRU encryption achieves higher speed processing than conventional public-key encryption, and is also capable of performing, when used in software processing, the processing in a practical period of time.

Accordingly, an encryption communication system using the NTRU encryption for the public-key encryption has an advantage that processes of the transmitting apparatus and receiving apparatus can be performed at higher speeds than an encryption communication system using conventional public-key encryption.

Although the proposed NTRU encryption scheme mentioned above is confidentiality encryption for encrypting data, later in time a digital signature scheme using the NTRU encryption has been proposed (see Non-Patent Reference 3). As to digital signature schemes, their schemes have been changed several times because of advent of cryptanalysis and the like. The following gives a brief description of a digital signature scheme called NTRUSign (for more details, see Patent Reference 2 and Non-Patent Reference 4).

In the key generation under the NTRUSign signature scheme, the private key and public key are generated by using multiple elements in a polynomial ring R with integer coefficients and an ideal of the ring R modulo a polynomial $X^N-1$. Here, "$X^a$" denotes X to the power of a. For generating a signature under the NTRUSign signature scheme for a message, the generated private key and a 2·N-dimensional vector, which is a hash value of the message, are used. For the signature verification of the NTRUSign signature scheme, the public key, the signature for the message, and the 2·N-dimensional vector are used. Since Non-Patent References 4 and 5 describe a ring and an ideal of the ring used in the NIRUSign signature scheme, their descriptions are left out here.

<NTRUSign Signature Scheme>
(1) Parameters of NTRUSign Signature Scheme

The NTRUSign signature scheme uses parameters of non-negative integers, N, q, df, dg, and Normbound. The meanings of these parameters are described next.

(1-1) Parameter N

The NTRUSign signature scheme is a digital signature scheme that performs signature generation and verification using polynomial operations. The degree of a polynomial used in the NTRUSign signature scheme is determined by the parameter N.

Polynomials used in the NTRUSign signature scheme are polynomials of degree N−1 or less with integer coefficients for the above parameter N. A polynomial $X^4+X^3+1$ is an example in the case when N=5. Note that a (mod $X^N-1$) operation is performed on the polynomial so as to always calculate a polynomial of degree N−1 or less with integer coefficients. This is because, by performing the (mod $X^N-1$) operation, a relational expression $X^N=1$ is realized, and therefore a variable of degree N or more can always be converted into a variable of degree N−1 or less. Here, it can be understood that a polynomial with integer coefficients obtained by performing the (mod $X^N-1$) operation on a polynomial is an element in the polynomial ring R.

In addition, both a public key h and a signature s are expressed as polynomials of degree N−1 or less. Besides, the private key is a set of four polynomials of degree N or less (f, g, F, G). Namely, f, g, F and G are all polynomials of degree N−1 or less and elements of the polynomial ring R. Note that the set of four (f, g, F, G) is treated as a further pair of two pairs (f, g) and (F, G) and hereinafter sometimes denoted as {(f, g), (F, G)}.

Then, the polynomial operation uses the relational expression $X^N=1$ for the parameter N to produce the result always being a polynomial of degree N−1 or less. For example, in the case where N=5, the product of a polynomial $X^4+X^2+1$ and a polynomial $X^3+X$ is always a polynomial of degree N−1 or less, as shown below, due to a relationship $X^5=1$:

$$(X^4+X^2+1)\times(X^3+X) = X^7+2\cdot X^5+2\cdot X^3+X =$$
$$X^2\cdot 1+2\cdot 1+2\cdot X^3+X = 2\cdot X^3+X^2+X+2$$

where × is the symbol for the multiplication of a polynomial by a polynomial, and • is the symbol for the multiplication of an integer by a polynomial (or an integer by an integer).

Note that, in the NTRUSign signature scheme, a polynomial of degree N−1, a=a_0+a_1•X+a_2•$X^2$+ . . . +a_(N−1)•$X^{(N-1)}$ is equated with a vector (a_0, a_1, a_2, . . . , a_(N−1)). a_0, a_1, a_2, . . . , and a_(N−1), are coefficients of the polynomial a and integers.

(1-2) Parameter q

The NTRUSign signature scheme uses the parameter q which is an integer of 2 or more and an ideal of the polynomial ring R. Coefficients of polynomials in the NTRUSign signature scheme are remainders modulo q.

(1-3) Parameters df and dg

How to select a polynomial f, which is a part of the private key used in the NTRUSign signature scheme, and a polynomial g used with the polynomial f for generating a polynomial h, which is the public key, is determined by parameters df and dg, respectively.

The polynomial f is selected so that df pieces of coefficients are 1 and the remaining coefficients are 0. That is, the polynomial f is a polynomial of degree N−1 or less, and has N pieces of coefficients from degree 0 (constant term) to degree N−1. Here, the polynomial f must be selected so that, among the N pieces of the coefficients, df pieces of coefficients are 1 and (N−df) pieces of coefficients are 0.

Then, the polynomial g is selected so that dg pieces of coefficients are 1 and the remaining coefficients are 0.

(1-4) Parameter Normbound

In the NTRUSign signature scheme, a distance between a 2•N-dimensional vector created from the signature s and a 2•N-dimensional vector, which is a hash value of the message, to be hereinafter described is calculated, and the authenticity of the signature is judged based on the distance. The Normbound is a threshold used in the judgment. Namely, if the distance is less than the Normbound, the signature is accepted as an authentic signature, whereas if the distance is the same as the Normbound or more, it is denied as an in authentic signature.

Non-Patent Reference 4 gives an example of parameters of the NTRUSign signature scheme: (N, q, df, dg, Normbound)= (251, 128, 73, 71, 310).

(2) Hash Value of Message and Distance between Norm and Vector

The NIRUSign signature scheme creates a signature corresponding to a hash value of a message m. The hash value of the message m is a polynomial pair of degree N, (m1, m2), and is equated with a 2•N-dimensional vector. Non-Patent Reference 1 details the hash function that calculates a hash value from a message.

The NTRUSign signature scheme uses a distance of a vector for the signature verification. The following describes the definition.

A norm $\|a\|$ of the polynomial $a = a\_0 + a\_1 \cdot X + a\_2 \cdot X^2 + \ldots + a\_(N-1) \cdot X^{(N-1)}$ is defined as:

$$\|a\| = sqrt((a\_0-\mu)^2 + (a\_1-\mu)^2 + \ldots + (a\_(N-1)-\mu)^2),$$

$$\mu = (1/N) \cdot (a\_0 + a\_1 + a\_2 + \ldots + a\_(N-1)),$$

where sqrt(x) is a square root of x.

The norm $\|(a, b)\|$ of the pair (a, b) of the polynomials a and b is defined as:

$$\|(a, b)\| = sqrt(\|a\|^2 + \|b\|^2).$$

The distance between the pair (a, b) of the polynomials a and b and the pair (c, d) of the polynomials c and d is defined as $\|(c-a, d-b)\|$.

Herewith, a polynomial of degree N−1 or less with integer coefficients obtained by performing the (mod X^N−1) operation can be regarded as an N-dimensional array in which the addition, subtraction, multiplication and a norm indicating the size of an element are defined, and the polynomial ring R can be regarded as a set of N-dimensional arrays.

(3) Key Generation of NTRUSign Signature Scheme

The NTRUSign signature scheme randomly generates the polynomials f and g using the parameters df and dg, as mentioned above. Then, as Non-Patent Reference 4 describes, a polynomial Fq which satisfies $Fq \times f = 1 \pmod{q}$ is used in an equation, $$h = Fq \times g \pmod{q}$$

to thereby generate the polynomial h. Here, the polynomial Fq is referred to as an inverse element of the polynomial f. Furthermore, the polynomials F and G are obtained, the norm of which is small enough to satisfy the following equation:

$$f \times G - g \times F = q.$$

The private key is denoted as $\{(f, g), (F, G)\}$, and the public key, as h. The private key is a key for generating a signature and also called a signature generation key. Additionally, the public key is a key for verifying the signature and also called a signature verification key.

Here, $x = y \pmod{q}$ is an operation to assign, to a coefficient of degree i of a polynomial x, a reminder obtained when a coefficient of degree i of a polynomial y is divided by a modulus q in a manner that the remainder falls in the range from 0 to q−1 ($0 \leq i \leq N-1$). That is, it is an operation where a mod-q operation is performed on a polynomial y so as to keep each coefficient of the polynomial y within the rage of 0 and (q−1), to whereby obtain a-polynomial, which is, then assigned to the polynomial x.

(4) Signature Generation of NTRUSign Signature Scheme

In the signature generation under the NIRUSign signature scheme, the signature s of the message m, on which digital signature operation is performed, is calculated. First, the 2•N-dimensional vector (m1, m2) (m1 and m2 are polynomials of degree N), which is a hash value for the message m, is calculated.

The 2•N-dimensional vector (m1, m2) and private key $\{(f, g), (F, G)\}$ are used to calculate the polynomials a, b, A and B satisfying the following equations:

$$G \times m1 - F \times m2 = A + q \times B; \text{ and}$$

$$-g \times m1 + f \times m2 = a + q \times b.$$

Here, coefficients of A and a are remainders -obtained when $G \times m1 - F \times m2$ is divided by the modulus q in a manner that the remainders fall in the range from $<-q/2>+1$ to $<q/2>$. That is, in the case where each remainder obtained by the division by the modulus q is between $<q/2>$ and q−1, q is subtracted from the remainder so that the remainder is adjusted to fall in the above range. Here $<x>$ denotes the largest number among numbers being x or less. For example, $<-1/2> = -1$.

Next, s and t are calculated using the following equations, and s is output as a signature:

$$s = f \times B + F \times b \pmod{q}; \text{ and}$$

$$t = g \times B + G \times b \pmod{q}.$$

(5) Signature Verification of NTRUSign Signature Scheme

In the signature verification under the NTRUSign signature scheme, it is verified whether the signature s is an authentic signature of the message m, on which digital signature operation is performed. First, the 2•N-dimensional vector (m1, m2), which is a hash value for the message m, is calculated.

The polynomial t is calculated with the following equation using the public key h:

$$t = s \times h \pmod{q}.$$

The distance between the 2•N-dimensional vectors (s, t) and (m1, m2) is found, and the distance is then checked whether to be less than the Normbound. When it is less than the Normbound, the signature s is accepted, being determined as the authentic signature. On the other hand, if the distance is the same as the Normbound or more, it is denied, being determined as an in authentic signature.

<Patent Reference 1> Published Japanese Translation of a PCT Application Originally Filed in English, No. 2000-516733.

<Patent Reference 2> WO2003/050998

<Non-Patent Reference 1> Tatsuaki Okamoto and Hiroshi Yamamoto, "Modern Cryptography", Sangyo Tosho (1997).

<Non-Patent Reference 2> J. Hoffstein, J. Pipher and J. H. Silverman, "NIFU: A Ring-Based Public Key Cryptosystem", Lecture Notes in Computer Science 1423, pp. 267-288, Springer-Verlag, (1998).

<Non-Patent Reference 3> J. Hoffstein, J. Pipher and J. Silverman, "NSS: An NIRU Lattice-Based Signature Scheme", Advances in Cryptology—Eurorcrypt '01, LNCS, Vol. 2045, pp. 123-137, Springer-Verlag, (2001).

<Non-Patent Reference 4> J. Hoffstein, N. Graham, J. Pipher, J. Silverman and W. Whyte, "NIRUSign: Digital Signatures Using the NIRU Lattice", CT-RSA'03, LNCS, Vol. 2612 pp. 122-140, Springer-Verlag, (2003).

SUMMARY OF THE INVENTION

Problems that the Invention is to Solve

The above-mentioned NTRUSign signature scheme is subject to attack called transcript attack. Transcript attack recovers the private key from multiple signed texts (pairs of a message and a signature). Since Non-Patent Reference 4 details transcript attack, only a brief description is given below.

Transcript attack takes advantage of that a difference, m1−s, between multiple signatures s and a part of the hash value (m1, m2) of the message-becomes $$m1-s = e1 \times f + e2 \times F$$

where e1 and e2 are polynomials whose coefficients fall in the range of −1/2 and 1/2, and finds part of the private key, f and F, by calculating the averages of the second and fourth moments of the difference m1−s. Here, the second moment a~2 of the polynomial a is the product a=a×a*, where a=a_0+a_1•X+a_2•X^2+ . . . +a_(N−2)•X^(N−2)+a_(N−1) •X^(N−1) and a reciprocal polynomial of a, a*=a_0+a_(N−1)•X+a_(N−2)•X^2+ . . . +a_2•X^(n−2)+a_1•X^(N−1). In addition, the fourth moment a~4 is a~2 to the power of 2, i.e. a~4=a~2×a~2.

$$\text{(the second moment of } m1 - s) =$$
$$(e1 \times f + e2 \times F) \times (e1^* \times f^* + e2^* \times F^*) =$$
$$e1 \sim \times f \sim + e2 \sim \times F \sim + e1 \times f \times e2^* \times F^* + e2 \times F \times e1^* \times f^*$$

If the number of the signed texts is increased, e1~ and e2~ included in the average of the second moment of m1−s converge to certain values k1 and k2, and e1×f×e2*×F* and e2×F×e1*×f* approximates 0. Accordingly, the number of the signed texts is large, the average of the second moments of m1−s is substantially equal to k1 ×f~+k2×F~. Furthermore, information related to f and F can be obtained from the average of the fourth moments in a similar fashion, and f can be found from these information. According to Non-Patent Reference 4, the numbers of signed texts required to obtain information related to the private key from the averages of the second moments and the fourth moments are 10^4 and 10^8, respectively. Hence, it is considered that 10^8 signed texts or more are required in order to make transcript attack on the NTRUSign signature scheme a success.

The present invention aims at offering a signature generation apparatus, a signature verification apparatus, a signature system, a signature generation method, a signature generation program, a signature verification method, a signature verification program, an integrated circuit for signature generation, and an integrated circuit for signature verification, all of which are capable of preventing transcript attack on signature data.

Means to Solve the Problem

In order to achieve the above object, the present invention is a signature generation apparatus for performing a digital signature operation with use of a signature key. The signature generation apparatus comprises: a key storage unit storing therein the signature key; a signature generation unit operable to perform the digital signature operation on signature target data with the use of the signature key to generate signature data; a counter unit operable to count a cumulative count of digital signature operations having been performed by the signature generation unit with the use of the signature key; a judgment unit operable to judge whether the cumulative count has reached a predetermined count; and a signature inhibition unit operable to, in the case where the judgment unit determines that the cumulative count has reached the predetermined count, inhibit the use of the signature key in the digital signature operation from then onward.

Here, the inhibition of the digital signature operation performed by the signature inhibition unit includes the following two concepts: a concept of inhibiting the use of the signature key stored in the key storage unit; and a concept of deleting the signature key stored in the key storage unit and writing a different signature key to the key storage unit—i.e. a concept of overwriting.

ADVANTAGEOUS EFFECTS OF THE INVENTION

According to the above structure, the signature generation apparatus counts the cumulative count of digital signature operations having been performed with the use of the signature key, and inhibits, in the case where the cumulative count has reached the predetermined count, the digital signature operation with the use of the signature key from then onward. As a result, transcript attack on a signature generated with the use of the signature key can be prevented.

In this case, the signature inhibition unit may generate a different signature key and overwrite the signature key stored in the key storage unit with them different signature key to inhibit the use of the signature key in the digital signature operation.

According to the structure, when the cumulative count has reached the predetermined count, the signature generation apparatus generates a different key, and overwrites the signature key stored in the key storage unit with the different key. Hence, the inhibition of the digital signature operation with the use of the signature key can be ensured.

In this case, the signature generation apparatus may further comprise: a verification key certificate storage unit storing therein a verification key certificate including (i) a verification key corresponding to the signature key and (ii) verification key signature data indicating authenticity of the verification key and generated by a $1^{st}$ private key; a public key certificate storage unit storing therein a public key certificate including (i) a public key corresponding to the $1^{st}$ private key and (ii) public key signature data indicating authenticity of the public key and generated by a $2^{nd}$ private key held by an outside functional entity; and a transmission unit operable to transmit the signature target data, the signature data generated by the signature generation unit, the verification key certificate, and the public key certificate to a signature verification apparatus that performs a verification of the signature data.

According to the structure, as to the verification key required for the verification of the signature data, the signature generation apparatus makes the verification key multilevel before the transmission to the signature verification apparatus, which thereby enhances the authenticity of the verification key.

In this case, the signature inhibition unit may, in order to inhibit the use of the signature key in the digital signature operation, (i) generate a different verification key that corresponds to the different signature key, (ii) generate different verification key signature data for the different verification key using the $1^{st}$ private key, (iii) generate a different verification key certificate that includes the different verification key and the different verification key signature data, and (iv) overwrite the verification key certificate stored in the public key certificate storage unit with the different verification key certificate.

According to the structure, the signature generation apparatus generates, when the cumulative account has reached the predetermined count, a different verification key certificate and overwrites the verification key certificate stored in the verification key certificate storage-unit with the different verification key certificate. Herewith, the different signature key and the different verification key certificate can be synchronized, and the signature generation apparatus is able to use the different signature key for the digital signature operation.

In this case, the signature generation apparatus may further comprise: an information storage unit storing therein $1^{st}$ key information indicating the signature key. Here, the signature generation unit obtains the signature key from the key storage unit based on the $1^{st}$ key information and generates the signature data using the obtained signature key. The key storage unit further scores therein a different signature key. The signature inhibition unit rewrites the $1^{st}$ key information stored in the information storage unit with $2^{nd}$ key information indicating the different signature key to inhibit the use of the signature key in the digital signature operation.

According to the structure, the signature generation apparatus rewrites the $1^{st}$ key information stored in the information storage unit with the $2^{nd}$ key information in the case where the cumulative count has reached the predetermined count, which thereby ensures the inhibition of the digital signature operation with the use of the signature key.

In this case, the signature generation unit may obtain the cumulative count, and the signature target data may include therein message data and the obtained cumulative count.

According to the structure, the signature generation apparatus includes message data and the cumulative count in the signature target data, which thereby enhances the authenticity of the signature data to be generated.

In this case, the signature generation apparatus may further comprise: a clock unit operable to time. Here, the signature generation unit obtains time information used as a standard of judgment for the time limit of validity of the signature data, and the signature target data includes therein message data and the obtained time information.

According to the structure, the signature generation apparatus includes message data and the time information in the signature target data, which thereby enhances the authenticity of the signature data to be generated.

In this case, the judgment unit may include a count storage subunit storing therein the predetermined count. Here, the signature generation apparatus further comprises: an update unit operable to update the predetermined count stored in the count storage subunit to a different predetermined count.

According to the structure, the signature generation apparatus is capable of updating the predetermined count even when the number of signature data pieces required to make transcript attack succeed is changed, and therefore can prevent transcript attack.

The present invention is also a signature verification apparatus for performing a verification of signature data generated by a signature generation apparatus that performs a digital signature operation with use of a signature key. The signature verification apparatus comprises: a reception unit operable to receive, from the signature generation apparatus, (i) signature target data including message data and a cumulative count of digital signature operations having been performed by the signature generation apparatus and (ii) the signature data corresponding to the signature target data; a count judgment unit operable to judge whether the cumulative count has reached a predetermined count; and a verification inhibition unit operable to inhibit the verification of the signature data in the case where the count judgment unit determines that the cumulative count has reached the predetermined count.

In this case, thee signature data may be generated using the signature key generated by the signature generation apparatus. Here, the reception unit, further receives (i) a verification key certificate including a verification key corresponding to the signature key and verification key signature data indicating authenticity of the verification key and generated by a $1^{st}$ private key, and (ii) a public key certificate including a $1^{st}$ public key corresponding to the $1^{st}$ private key and public key signature data indicating authenticity of the $1^{st}$ public key and generated by a $2^{nd}$ private key held by an outside functional entity. The verification unit includes: a key storage unit storing therein a $2^{nd}$ public key corresponding to the $2^{nd}$ private key; a $1^{st}$ verification unit operable to, in the case where the time limit judgment unit determines that the time limit has been over, perform a verification of authenticity of the public key certificate, using the $2^{nd}$ public key; a $2^{nd}$ verification unit operable to, in the case where the authenticity of the public key certificate is verified, perform a verification of authenticity of the verification key certificate, using the it public key; and a $3^{rd}$ verification unit operable to, in the case where the authenticity of the verification key certificate is verified, perform a verification of authenticity of the signature data.

According to the structure, the signature verification apparatus receives the multilevel verification key and performs signature verifications in the descending order from the upper level, which thereby allows for highly reliable verification.

In this case, the signature verification apparatus may further comprise: a transmission unit operable to, in the case where the count judgment unit determines that the cumulative count has reached the According to the structure, the signature verification apparatus inhibits the verification of the received signature data in the case when the cumulative count included in the received signature target data has reached the predetermined count. Herewith, when signature data whose cumulative count has reached the predetermined count is received, the signature verification apparatus is able to recognize the received signature data as inauthentic without verification.

In this case, the signature target data may further include $1^{st}$ time information used as a standard of judgment for a time limit of validity of the signature data. Here, the signature verification apparatus further comprises: a clock unit operable to time; a time limit judgment unit operable to, in the case where the judgment unit determines that the cumulative count has not reached the predetermined count, obtain $2^{nd}$ time information indicating a current time using the clock unit and judge whether the time limit of validity has been over using the $1^{st}$ and the $2^{nd}$ time information; and a verification unit operable to verify the signature data in the case where the time judgment unit determines that the time limit of validity has not been over. The verification inhibition unit inhibits the verification of the signature data in the case where the time limit judgment unit determines that the time limit has been over.

According to the structure, the signature verification apparatus inhibits the verification of the received signature data in the case the time limit of validity of the received signature data has been over. Herewith, when signature data whose time limit of validity has been over, the signature verification apparatus is able to recognize the received signature data as inauthentic without verification. predetermined count, transmit specification information specifying the signature generation apparatus that has generated the signature data to According to the structure, when the cumulative count included in the received signature target data has reached the predetermined count, the signature verification apparatus transmits to an external apparatus, the specification information specifying the signature generation apparatus that has generated the received signature data. Accordingly, it is possible to cause the external apparatus to manage the signature generation apparatus having generated inauthentic signature data.

In this case, the count judgment unit may include a count storage area which stores therein the predetermined count. Here, the signature verification apparatus further comprises: an update unit Operable to receive a different predetermined count from the signature generation apparatus and update the predetermined count stored in the count judgment unit to the different predetermined count.

According to the structure, the signature verification apparatus is able to synchronize the predetermined count with the signature generation apparatus.

The present invention is also a signature system comprising a signature generation apparatus for performing a digital signature operation with use of a signature key and a signature verification apparatus for performing a verification of signature data generated by the signature generation apparatus. The signature generation apparatus includes: a key storage unit storing therein the signature key; a signature generation unit operable to perform, with the use of the signature-key, the digital signature operation on signature target data including message data and a cumulative count of digital signature operations having been performed by the signature generation unit using the signature key, to generate the signature data; a counter unit operable to count the cumulative count; a judgment unit operable to judge whether the cumulative count has reached a predetermined count; a signature inhibition unit operable to, in the case where the judgment unit determines that the cumulative count has reached the predetermined count, inhibit the use of the signature key in the digital signature operation from then onward; and a transmission unit operable to transmit a data group including the signature target data and the signature data to the signature verification apparatus. The signature verification apparatus includes: a reception unit operable to receive the data group; a count judgment unit operable to judge whether the cumulative count included in the signature target data of the received data group has reached a predetermined count; and a verification inhibition unit operable to inhibit the verification of the signature data in the case where the count judgment unit determines that the cumulative count has reached the predetermined count.

According to the structure, the signature generation apparatus of the signature system counts the cumulative count of digital signature operations having been performed with the use of the private key, and inhibits, in the case where the cumulative count has reached the predetermined count, the signature verification with the use of the private key from then onward. Therefore, transcript attack on a signature generated with the use of the private key can be prevented. Additionally, the signature verification apparatus of the signature system inhibits, in the case where the cumulative count included in the received signature target data has reached the predetermined count, the verification of the received signature data.

Herewith, when receiving signature data whose cumulative count has received the predetermined count, the signature verification apparatus is able to recognize the received signature data as inauthentic without verification.

In this case, the signature system may further comprise a monitoring apparatus for monitoring the data group transmitted from the signature generation apparatus to the signature verification apparatus. Here, the monitoring apparatus includes: an obtaining unit operable to obtain the data group from a transmission channel connecting the signature generation apparatus and the signature verification apparatus; a log storage unit storing therein one or more data groups previously obtained prior to the data group being obtained; a data judgment unit operable to judge whether the obtained data group is authentic, using the previously-obtained data groups; and an information transmission unit operable to, in the case where the data judgment unit determines that the obtained data group is not authentic, transmit specification information specifying the signature generation apparatus that has generated the signature data included in the obtained data group to an external apparatus.

According to the structure, the monitoring apparatus of the signature system monitors the authenticity of the data group passing through the transmission channel, and transmits, in the case where the data group is inauthentic, the specification information specifying the signature generation apparatus having generated the signature data which is included in the data group to the external apparatus. Accordingly, it is possible that the signature system causes the external apparatus to manage the signature generation apparatus having generated the signature data which is included in the inauthentic data group.

In this case, the data group may further include a verification key corresponding to the signature key. Here, the previously-obtained data groups each have previously-obtained signature target data including a previously-obtained cumulative count and a previously-obtained verification key. The data judgment unit judges authenticity of the obtained data group based on a search, among the previously-obtained data groups in the log storage unit, for a matching data group whose previously-obtained signature target data includes a previously-obtained verification key and a previously-obtained verification key matching the verification key and the cumulative count, respectively, of the obtained data group, and determines that the obtained data group is not authentic in a case where the matching data group is found in the search.

According to the structure, the monitoring apparatus of the signature system is able to determine the authenticity of the data group using the verification key and the cumulative count included in the data group.

BRIEF DESCRIPTION OF THE DRAWINGS

FIG. 6 is a block diagram showing a structure of a digital signature system 1000;

FIG. 8 is a flowchart showing operation of a signature verification process performed in a signature verification apparatus 1020; and FIG. 9 is a flowchart showing operation of a monitoring process performed in a signature monitoring server 1030.

EXPLANATION OF REFERENCES

Figure 1:
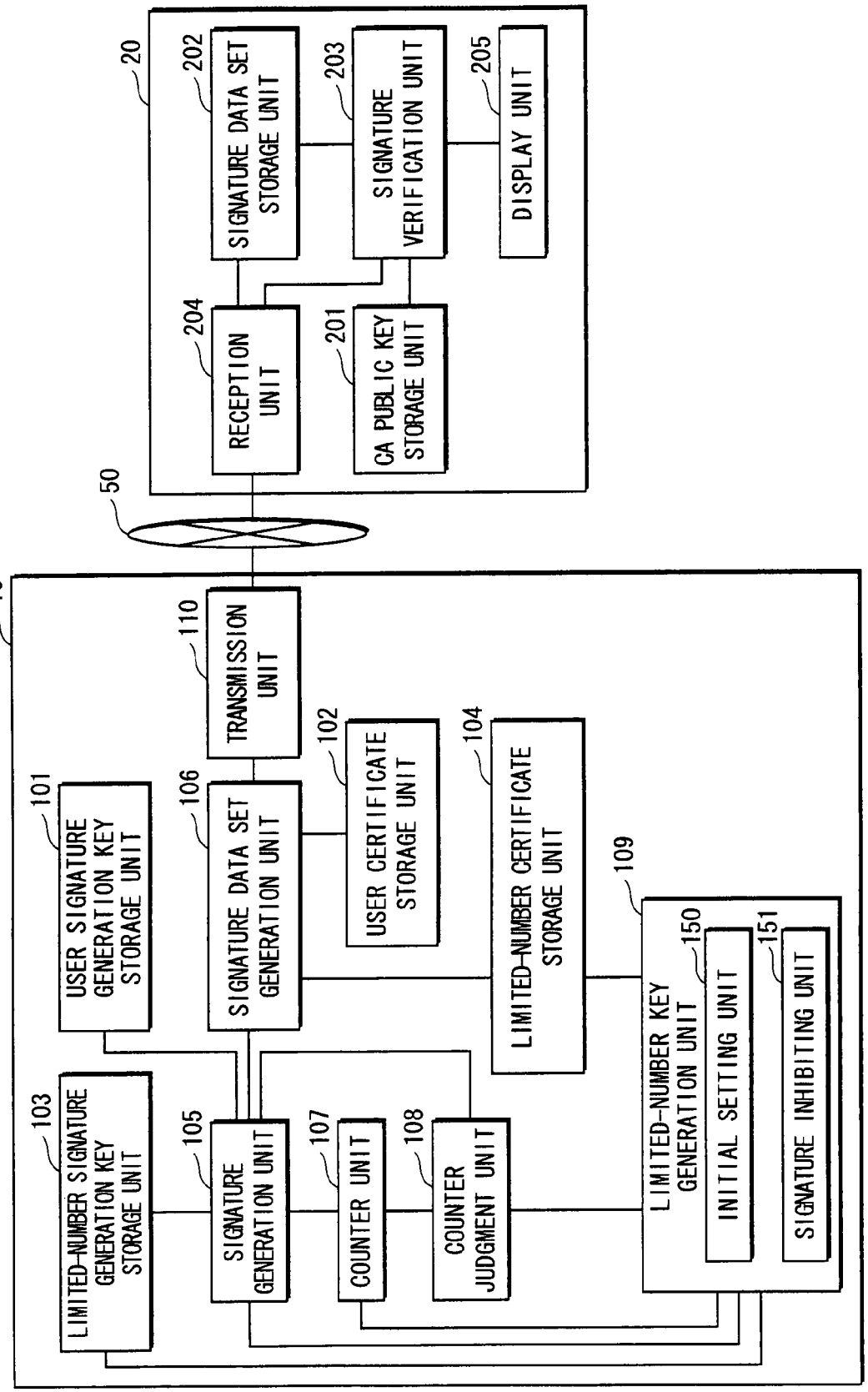
FIG. 1 is a block diagram showing a structure of a digital signature system 1.

1 digital signature system
10 signature generation apparatus
20 signature verification apparatus
50 communication channel
101 user signature generation key storage unit
102 user certificate storage unit
103 Limited-Number signature generation key storage unit
104 Limited-Number certificate storage unit
105 signature generation unit
106 signature-data set generation unit
107 counter unit
108 counter judgment unit
109 Limited-Number key generation unit
110 transmission unit
150 initial setting unit
151 signature inhibiting unit
201 CA public key storage unit
202 signature data set storage unit
203 signature verification unit
204 reception unit
205 display unit
1000 digital signature system
1010 signature generation apparatus
1020 signature verification apparatus
1030 signature monitoring server
1040 center
1050 communication channel
1101 user signature generation key storage unit
1102 user certificate storage unit
1103 Limited-Number signature generation key storage unit
1104 Limited-Number certificate storage unit
1105 signature generation unit
1106 signature data set generation unit
1107 counter unit
1108 counter judgment unit
1109 Limited-Number key generation unit
1110 transmission unit
1111 clock unit
1201 CA public key storage unit
1202 signature data set storage unit
1203 signature verification unit
1204 reception unit
1205 display unit
1206 counter judgment unit
1207 time judgment unit
1208 clock unit
1301 log storage unit
1302 communication monitoring unit
1303 signature data set obtaining unit
1304 signature data set judgment unit
1305 transmission and reception unit

DETAILED DESCRIPTION OF THE INVENTION

1. Embodiment 1

A digital signature system 1 is described below as Embodiment 1 of the present invention with the aid of drawings.

1.1 Overview of Digital Signature System 1

The digital signature system 1 comprises a signature generation apparatus 10, a signature verification apparatus 20 and a communication channel 50, as shown in FIG. 1.

The signature generation apparatus 10 generates signature data set SS for message data m, and transmits the signature data set SS to the signature verification apparatus 20 via the communication channel 50. Note that the composition of the signature data set SS is hereinafter described.

The signature verification apparatus 20 receives the signature data set SS, and verifies whether the received signature data set SS is an authentic signature of the message data m. When determining that the signature data set SS is the authentic signature, the signature verification apparatus 20 accepts the signature data set SS; whereas when determining it is an inauthentic signature, the signature verification apparatus 20 declines the signature data set SS.

1.2 Structure of Signature Generation Apparatus 10

The signature generation apparatus 10, as shown in FIG. 1, comprises: a user signature generation key storage unit 101; a user certificate storage unit 102; a Limited-Number signature generation key storage unit 103; a Limited-Number certificate storage unit 104; a signature generation unit 105; a signature data set generation unit 106; a counter unit 107; a counter judgment unit 108; a Limited-Number key generation unit 109; and a transmission unit 110.

The signature generation apparatus 10 stores therein a Limited-Number signature generation key, which is a private key used in the NTRUSign signature scheme, and a Limited-Number certificate, which is a public key certificate for a public key corresponding to the private key, and generates signature data S for the message data m entered thereto, using the Limited-Number signature generation key. In addition, the signature generation apparatus 10 counts the number of signature data pieces generated by using the Limited-Number signature generation key, and generates new Limited-Number signature generation key and Limited-Number certificate when the count number is a predetermined threshold tc or more.

Note that the threshold tc is set to the number of signatures with which transcript attack on the NTRUSign signature scheme cannot be made a success, and is $10^7$, for example. The details of the Limited-Number certificate are hereinafter described.

(1) User Signature Generation Key Storage Unit 101

The user signature generation key storage unit 101 stores therein a user signature generation key KMG used for generating a Limited-Number certificate CL. It is assumed that the user signature generation key HUG is provided with the user signature generation key storage unit 101 in advance.

Here, the Limited-Number certificate CL is made up of a Limited-Number signature verification key KLV (public key) corresponding to the Limited-Number signature generation key and signature data SKLV, which is created by performing digital signature operation on the Limited-Number signature verification key KLV using the user signature generation key KUG.

Note that the Limited-Number certificate may include other data besides the Limited-Number signature verification key KLV and the signature data SKLV. For example, an identifier for identifying the Limited-Number certificate may be included therein. The signature data SKLV is generated based on the NTRUSign signature scheme. The NTRUSign signature scheme is a publicly known technique as is detailed in Non-Patent Reference 4, and is therefore not explained here.

(2) User Certificate Storage Unit 102

The user certificate storage unit 102 stores therein a user certificate CU corresponding to the user signature generation key KUG. The user certificate CU is made up of a user signature verification key KUV corresponding to the user signature generation key and signature data SKUV created by performing digital signature operation on the user signature verification key KU using the private key of a certificate generation server CA (not shown). The signature data SKUV is also generated based on the NTRUSign signature scheme. It is assumed that the user certificate CU is provided with the user certificate storage unit 102 in advance, similarly to the user signature generation key KUG. Note that the user certificate CU may include other data besides the user signature verification key KUV and the signature data SKUV. For example, the user's identifier and the expiration date for the certificate may be included therein.

Here, the certificate generation server CA is an apparatus provided at a functional entity called a certificate authority, and issues a "user certificate" indicating that the user signature verification key KUV is the correct public key (an "approval" for the public key). That is, the user certificate storage unit 102 prestores therein the user certificate CU issued by the certificate generation server CA. The certificate authority generates signature generation keys and user signature verification keys which are different for each signature generation apparatus, and generates user certificates for the generated user signature verification keys using the certificate generation server CA. The certificate authority distributes the generated user signature generation keys and user certificates to corresponding signature generation apparatuses. Herewith, the signature generation apparatuses are able to prestore their user signature generation keys and user certificates.

(3) Limited-Number Signature Generation Key Storage Unit 103

The Limited-Number signature generation key storage unit 103 includes an area for storing a Limited-Number signature generation key KLG used for generating signature data for message data.

The signature generation apparatus 10 generates a Limited-Number signature generation key and stores the generated Limited-Number signature generation key in the Limited-Number signature generation key storage unit 103.

(4) Limited-Number Certificate Storage Unit 104

The Limited-Number certificate storage unit 104 includes an area for storing a Limited-Number certificate CL corresponding to the Limited-Number signature generation key KLG.

The signature generation apparatus 10 generates a Limited-Number certificate and stores the generated Limited-Number certificate in the Limited-Number certificate storage unit 104.

(5) Signature Generation Unit 105

The signature generation unit 105 generates the signature data S for the message data m and the signature-data SKLV of the Limited-Number signature verification key KLV.

<Generation of Signature Data S>

When receiving a $1^{st}$ signature generation instruction indicating to generate signature data for the message data m from the signature data set generation unit 106, the signature generation unit 105 reads the Limited-Number signature generation key KLG stored in the Limited-Number signature generation key storage unit 103, and generates the signature data S for the message data m using the read Limited-Number signature generation key KLG—namely, generates the signature data S by performing digital signature operation on the message data m.

When the generation of the signature data S is complete, the signature generation unit 105 outputs a $1^{st}$ completion notice indicating the completion status to the signature data set generation unit 106.

After outputting the $1^{st}$ completion notice to the signature data set generation unit 106, the signature generation unit 105 outputs, to the counter judgment unit 108, a counter judgment instruction to make a judgment whether the count number is the predetermined threshold tc or more.

Note that the signature data S is generated based on the NTRUSign signature scheme.

<Generation of Signature Data SKLV>

When receiving a $2^{nd}$ signature generation instruction indicating to generate the signature data SKLV for the user, signature verification key KLV from the Limited-Number key generation unit 109, the signature generation unit 105 reads the user signature generation key KUG stored in the user signature generation key storage unit 101, and generates, using-the user signature generation key KUG, the signature data SKLV for the Limited-Number signature verification key KLV generated by the Limited-Number key generation unit 109—namely, generates the signature data SKLV by performing digital signature operation on the Limited-Number signature verification key KLV. Note that the operation of the Limited-Number key generation unit 109 is hereinafter described.

When the generation of the signature data SKLV is complete, the signature generation unit 105 outputs a $2^{nd}$ completion notice indicating the completion status to the Limited-Number key generation unit 109.

Note that the signature data SKLV is generated based on the NTRUSign signature scheme.

In the key update, when a Limited-Number signature verification key KLVN is generated by the Limited-Number key generation unit 109, the signature generation unit 105 generates a signature data SKLVN by a similar operation described above. At this point, the signature generation unit 105 generates the signature data SKLVN using the Limited-Number signature verification key KLVN generated by the Limited-Number key generation unit 109 as a new Limited-Number signature verification key KLV.

(6) Signature Data Set Generation Unit 106

When receiving the message data m according to a user's operation, the signature data set generation unit 106 reads the Limited-Number certificate CL and the user certificate CU from the Limited-Number certificate storage unit 104 and the user certificate storage unit 102, respectively.

The signature data set generation unit 106 outputs the $1^{st}$ signature generation instruction to the signature generation unit 105. Subsequently, when receiving the $1^{st}$ completion notice from the signature generation unit 105, the signature data set generation unit 106 generates the signature data set SS made up of the message data m, the signature data S generated by the signature generation unit 105 for the message data m, the read Limited-Number certificate CL, and the read user certificate CU.

The signature data set generation unit 106 transmits the generated signature data set SS to the signature verification apparatus 20 via the transmission unit 110.

(7) Counter Unit 107

The counter unit 107 includes therein a counter for counting the number of signature data pieces generated by using the Limited-Number signature generation key KLG, and holding the count of signature data pieces that have been generated so far.

When receiving an initial value setting instruction to set a counter value c to an initial value 0 from the Limited-Number key generation unit 109, the counter unit 107 sets the counter value c=0.

When the signature data S is generated by the signature generation unit 105, the counter unit 107 adds 1 to the counter value c and newly holds the added result as the counter value c.

Herewith, the counter unit 107 is able to count the number of signature data pieces that have been generated with the Limited-Number signature generation key KLG stored in the Limited-Number signature generation key storage unit 103. In other words, the counter unit 107 is able to count the number of times the Limited-Number signature generation key KLG has been used.

(8) Counter Judgment Unit 108

The counter judgment unit 108 prestores therein the threshold tc.

When receiving the counter judgment instruction from the signature generation unit 105, the counter judgment unit 108 judges whether the counter value c of the counter unit 107 is the threshold tc or more.

When determining that it is the threshold tc or more, the counter judgment unit 108 outputs a key update instruction indicating to update the Limited-Number signature generation key and the Limited-Number signature verification key to the Limited-Number key generation unit 109.

(9) Limited-Number Key Generation Unit 109

The Limited-Number key generation unit 109 generates a-Limited-Number signature generation key and a Limited-Number certificate.

The Limited-Number key generation unit 109 comprises, as shown in FIG. 1, an initial setting unit 150 and a signature inhibiting unit 151.

<Initial Setting Unit 150>

The initial setting unit 150 generates a Limited-Number signature generation key and a Limited-Number certificate which are stored as initial settings in the Limited-Number signature generation key storage unit 103 and Limited-Number certificate storage unit 104, respectively.

The following explains the operation.

When receiving an initial setting instruction indicating to make initial settings according to a user's operation, the initial setting unit 150 of the Limited-Number key generation unit 109 generates a private key and a public key in the NTRUSign signature scheme.

The initial setting unit 150 sets the generated private key as the Limited-Number signature generation key KLG and sets the generated public key as the Limited-Number signature verification key KLV, and stores the Limited-Number signature generation key KLG in the Limited-Number signature generation key storage unit 103.

The initial setting unit 150 outputs the $2^{nd}$ signature generation instruction to the signature generation unit 105. Subsequently, when receiving the $2^{nd}$ completion notice from the signature generation unit 105, the initial setting unit 150 generates the Limited-Number certificate CL made up of the Limited-Number signature verification key KLV and the signature data SKLV generated by the signature generation unit 105.

The initial setting unit 150 stores the generated Limited-Number certificate CL in the Limited-Number certificate storage unit 104.

The initial setting unit 150 outputs an initial value setting instruction to the counter unit 107.

<Digital signature operation Inhibiting Unit 151>

The signature inhibiting unit 151 corresponds to the signature inhibition unit mentioned in the "Means to Solve the Problem" above, and inhibits, when the counter value c is the threshold tc or more, the digital signature operation using a private key stored in the Limited-Number signature generation key storage unit 103 at the point.

Here, a concept of overwriting is used as an example of digital signature operation inhibition.

The operation of the signature inhibiting unit 151 is described next.

When receiving the key update instruction from the counter judgment unit 108, the signature inhibiting unit 151 generates a new Limited-Number signature generation key KLGN and a new Limited-Number signature verification key KLVN as a private key and a public key, respectively, in accordance with the key generation under the NTRUSign signature scheme.

The signature inhibiting unit 151 first deletes the Limited-Number signature generation key KLG stored in the Limited-Number signature generation key storage unit 103, and then writes the Limited-Number signature generation key KLGN as a new Limited-Number signature generation key KLG to the Limited-Number signature generation key storage unit 103. That is, the signature inhibiting unit 151 updates the private key by overwriting the Limited-Number signature generation key KLC stored in the Limited-Number signature generation key storage unit 103 with the Limited-Number signature generation key KLGN.

The signature inhibiting unit 151 outputs the $2^{nd}$ signature generation instruction. Subsequently, when receiving the $2^{nd}$ completion notice from the signature generation unit 105, the signature inhibiting unit 151 generates a Limited-Number certificate CLN made up of the Limited-Number signature verification key KLVN and the signature data SKLVN generated by the signature generation unit 105. At this point, the signature inhibiting unit 151 generates the Limited-Number certificate CLN using the Limited-Number signature verification key KLVN and signature data SKLVN as a new Limited-Number signature verification key KLV and a new signature data SKLV, respectively.

The signature inhibiting unit 151 deletes the Limited-Number certificate CL stored in the Limited-Number certificate storage unit 104, and subsequently writes the generated Limited-Number certificate CLN to the Limited-Number certificate storage unit 104 as a new Limited-Number certificate CL. That is, the signature inhibiting unit 151 updates the certificate by overwriting the Limited-Number certificate CL stored in the Limited-Number certificate storage unit 104 with the generated Limited-Number certificate CLIN.

The signature inhibiting unit 151 outputs the initial value setting instruction to the counter unit 107.

(10) Transmission Unit 110

The transmission unit 110 transmits the signature data set SS to the signature verification apparatus 20 via the communication channel 50.

1.3 Structure of Signature Verification Apparatus 20

The signature verification apparatus 20 comprises, as shown in FIG. 1, a CA public key storage unit 201, a signature data set storage unit 202, a signature verification unit 203, a reception unit 204 and a display unit 205.

(1) CA Public Key Storage Unit 201

The CA public key storage unit 201 stores therein a public key (signature verification key) KPC corresponding to a private key held by the certificate generation server CA (not shown) used for verification of the user certificate CU.

(2) Signature Data Set Storage Unit 202

The signature data set storage unit 202 has an area for storing the signature data set SS.

(3) Signature Verification Unit 203

The signature verification unit 203 performs a verification of the signature data S included in the signature data set SS, the signature data SKLV included in the Limited-Number certificate, CL and the signature data SKUV included in the user certificate CU.

The following describes operation of signature data verification.

The signature verification unit 203 receives a verification start instruction indicating to start a verification from the reception unit 204.

The signature verification unit 203 verifies whether the signature data SKUV is an authentic signature of the user signature verification key KUV, using the CA public key KPC stored in the CA public key storage unit.

When determining that the signature data SKUV is the authentic signature, the signature verification unit 203 verifies whether the signature data SKLV is an authentic signature of the Limited-Number signature verification key KLV, using the user signature verification key KUV.

When determining that the signature data SKLV is the authentic signature, the signature verification unit 203 verifies whether the signature data S is an authentic signature of the message data m, using the Limited-Number signature verification key KLV.

When determining that the signature data S is the authentic signature, the signature verification unit 203 outputs to the display unit 205, a message "OK" indicating to accept the received signature data set SS.

When determining that signature data is not the authentic signature in any of the signature verifications, the signature verifications unit 203 outputs to the display unit 205, a message "NG" indicating to reject the received signature data set SS.

(4) Reception Unit 204

The reception unit 204 receives the signature data set SS transmitted from the signature generation apparatus 10 via the communication channel 50.

The reception unit 204 stores the received signature data set SS in the signature data set storage unit 202, and subsequently outputs the verification start instruction to the signature verification unit 203.

(5) Display Unit 205

When receiving a message regarding the result of the signature examinations from the signature verification unit 203, the display unit 205 displays the received message.

1.4 Operation of Signature Generation Apparatus 10

The operation of the signature generation apparatus 10 includes: an "initial setting process" in which initial settings of the Limited-Number signature generation key and Limited-Number certificate are performed; a "signature generation process" in which a signature is generated; and a "counter value checking process" in which a counter value is checked and a Limited-Number signature generation key and a Limited-Number certificate are generated. The following describes each of these processes.

(1) Initial Setting Process

Figure 2:
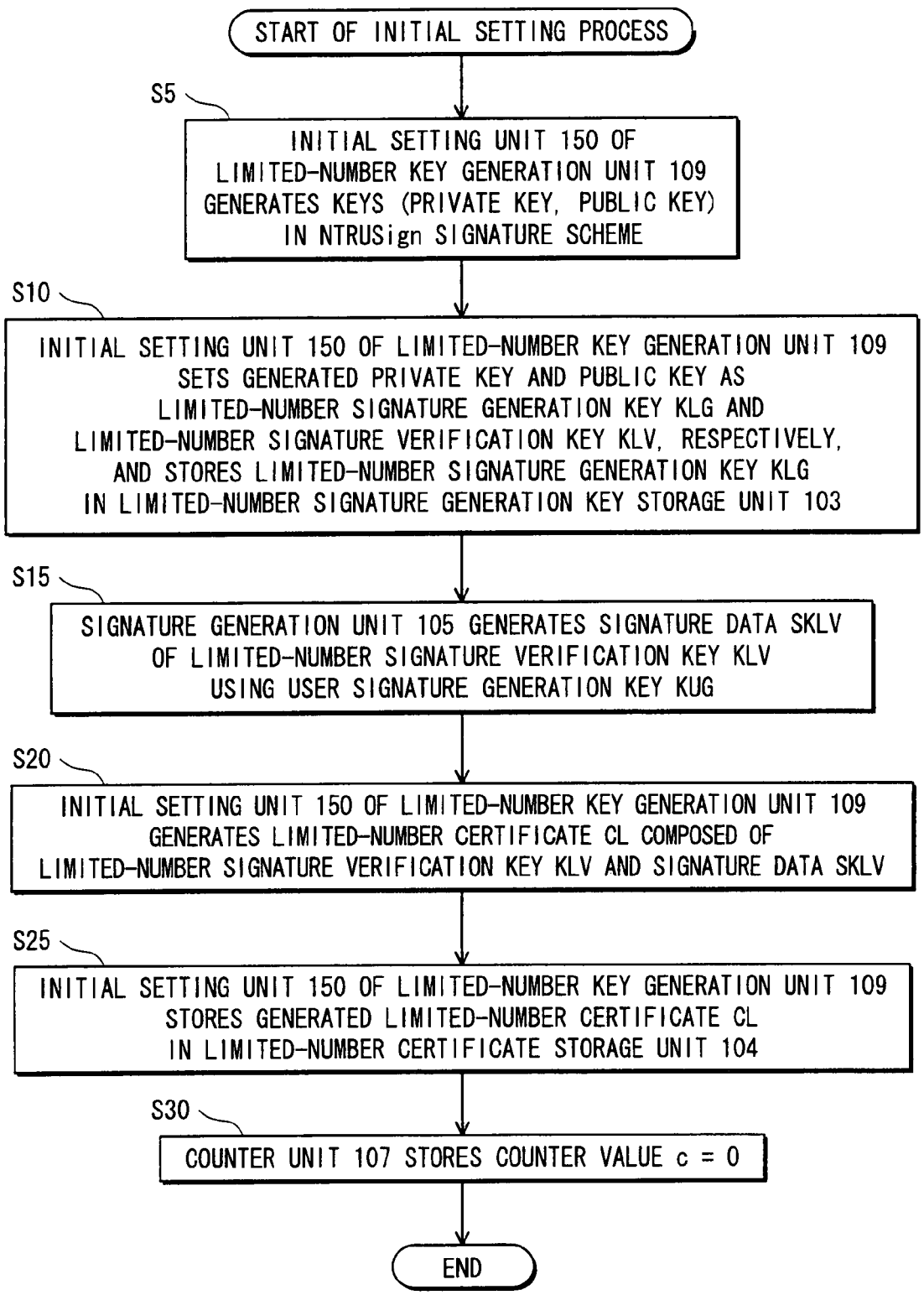
FIG. 2 is a flowchart showing operation of an initial setting process performed in a signature generation apparatus 10.

The operation of the initial setting process is explained with reference to the flowchart of FIG. 2.

When receiving an initial setting instruction according to a user's operation, the initial setting unit 150 of the Limited-Number key generation unit 109 generates a private key and a public key in accordance with the key generation under the NTRUSign signature scheme (Step S5), sets the generated private key and public key as the Limited-Number signature generation key KLG and the Limited-Number signature verification key KLV, respectively, and stores the Limited-Number signature generation key KLG in the Limited-Number signature generation key storage unit 103 (Step S10).

The initial setting unit 150 of the Limited-Number key generation unit 109 outputs the $2^{nd}$ signature generation instruction to the signature generation unit 105. When receiving the $2^{nd}$ signature generation instruction from the Limited-Number key generation unit 109, the signature generation unit 105 generates the signature data SKLV of the Limited-Number signature verification key KLV using the user signature generation key KUG stored in the user signature generation key storage unit 101 (Step S15).

The signature generation unit 105 outputs the $2^{nd}$ completion notice to the initial setting unit 150 of the Limited-Number key generation unit 109. When receiving the $2^{nd}$ completion notice from the signature generation unit 105, the initial setting unit 150 of the Limited-Number key generation unit 109 generates the Limited-Number certificate CL made up of the Limited-Number signature verification key KLV and the signature data SKLV generated by the signature generation unit 105 (Step S20), and stores the generated Limited-Number certificate CL in the Limited-Number certificate storage unit 104 (Step S25).

The initial setting unit 150 of the Limited-Number key generation unit 109 outputs the initial value setting instruction to the counter unit 107. When receiving the initial value setting instruction form the Limited-Number key generation unit 109, the counter unit 107 stores the counter value c=0 therein (Step S30).

(2) Signature Generation Process

Figure 3:
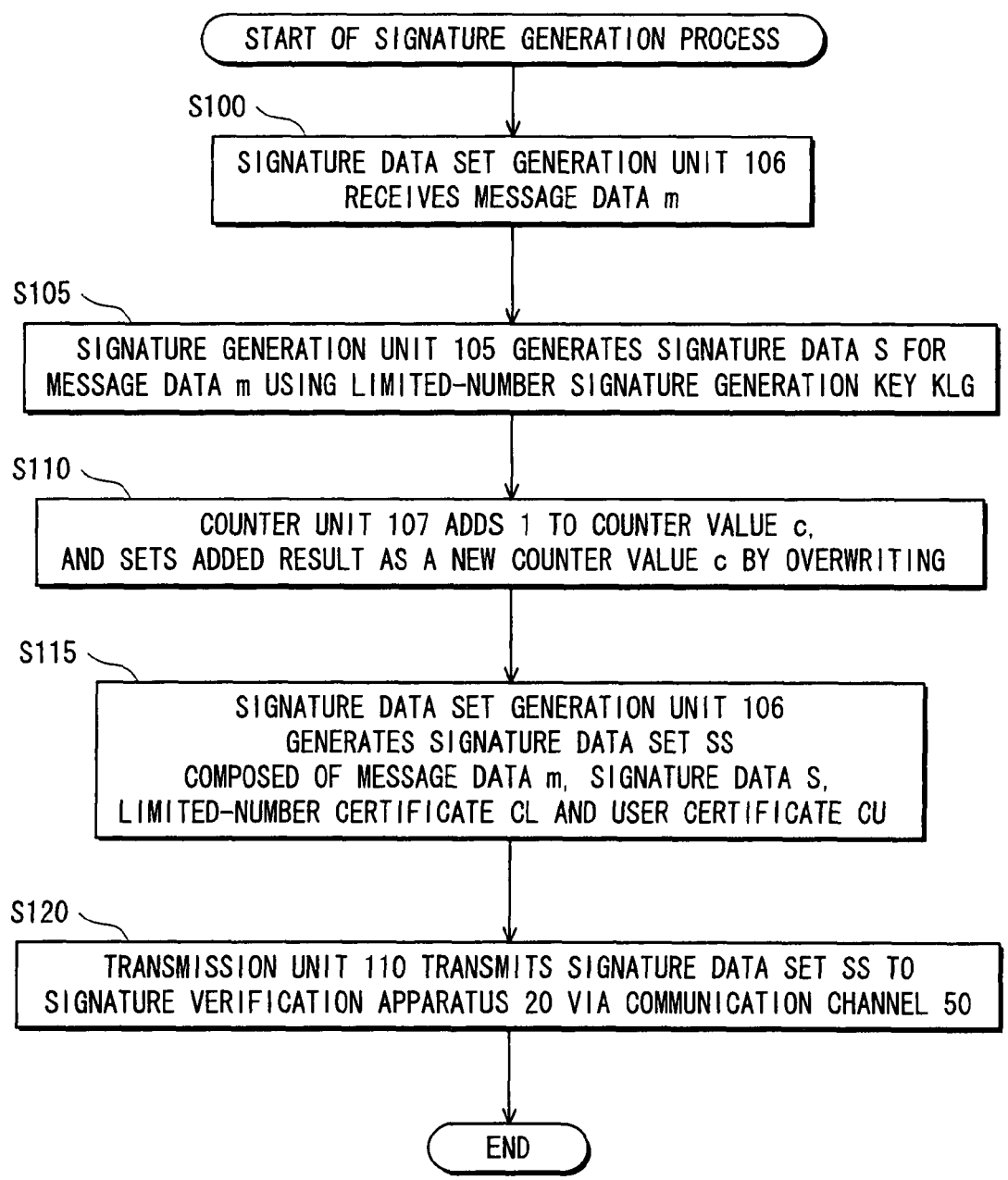
FIG. 3 is a flowchart showing operation of a signatures generation process performed in the signature generation apparatus 10.

The operation of the signature generation process is explained with reference to the flowchart of FIG. 3.

The signature data set generation unit 106 receives the message data m according to a user's operation (Step S100).

The signature data set generation unit 106 reads the Limited-Number certificate CL and the user certificate CU from the Limited-Number certificate storage unit 104 and the user certificate storage unit 102, respectively, and outputs the $1^{st}$ signature generation instruction to the signature generation unit 105. When receiving the $1^{st}$ signature generation instruction from the signature data set generation unit 106, the signature generation unit 105 reads the Limited-Number signature generation key KLG stored in the Limited-Number signature generation key storage unit 103, and generates the signature data S for the message data m using the read Limited-Number signature generation key KLG (Step S105). The counter unit 107 adds 1 to the counter value c and sets the added result as a new counter value c (Step S110).

When the generation of the signature data S is complete the signature generation unit 105 outputs the $1^{st}$ completion notice indicating the completion status to the signature data set generation unit 106. When receiving the $1^{st}$ completion notice from the signature generation unit 105, the signature data set generation unit 106 generates the signature data set SS made up of the message data m, the signature data S generated by the signature generation unit 105 for the message data m, the read Limited-Number certificate CL and the read user certificate CU (Step S115).

The transmission unit 110 transmits the signature data set SS generated by the signature data set generation unit 106 to the signature verification apparatus 20 via the communication channel 50 (Step S120).

(3) Counter Value Checking Process

Figure 4:
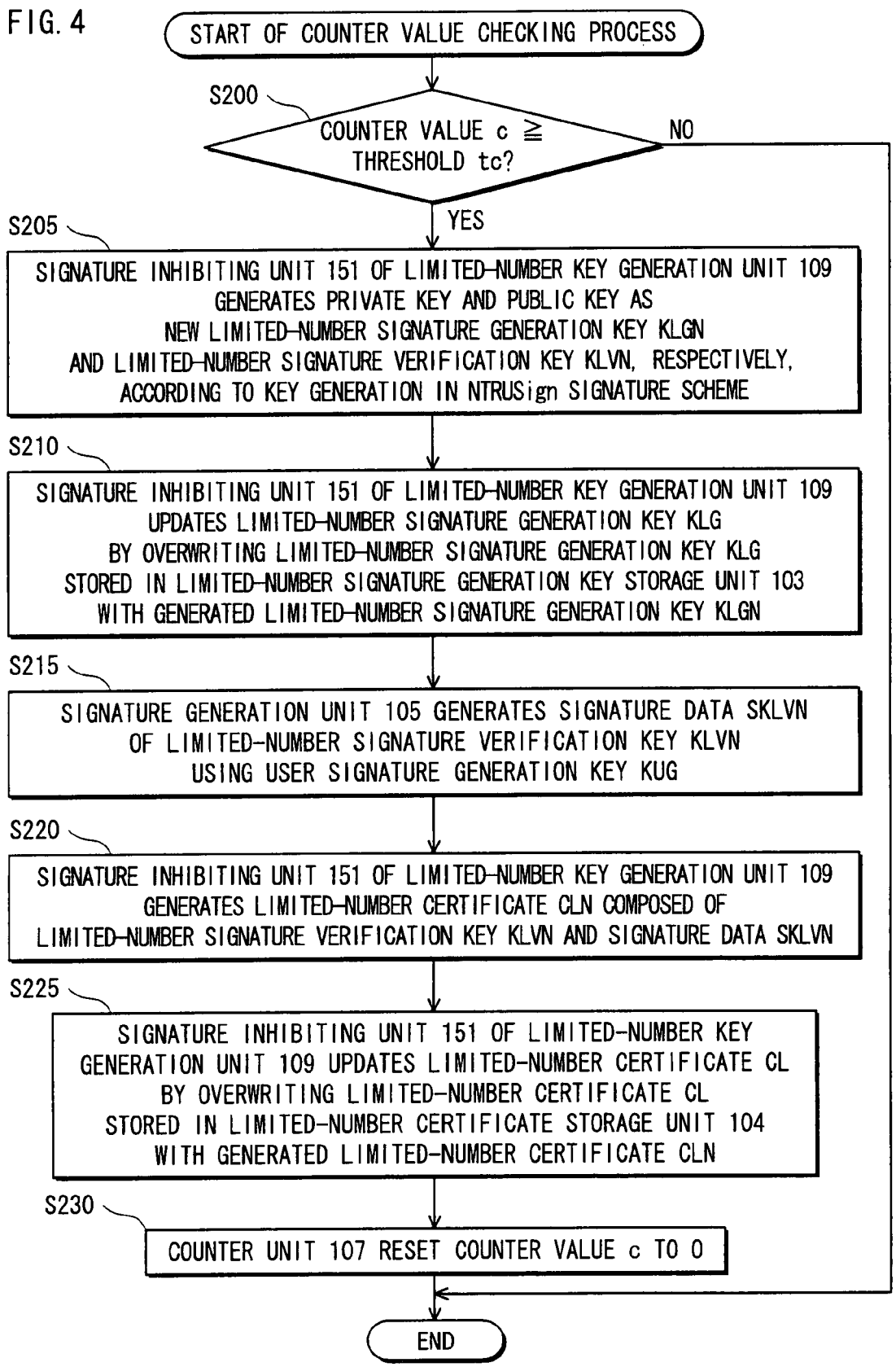
FIG. 4 is a flowchart showing operation of a counter value checking process performed in the signature generation apparatus 10.

The operation of the counter value checking process is explained with reference to the flowchart of FIG. 4. It is assumed here that the signature generation unit 105 has output the counter judgment instruction to the counter judgment unit 108 after the implementation of Step S105 in the signature generation process.

When receiving the counter judgment instruction from the signature generation unit 105, the counter judgment unit 108 judges whether the counter value c of the counter unit 107 is the threshold tc or more (Step S200).

When the counter judgment unit 108 determines that it is not the threshold tc or more ("No" in Step S200), the counter value checking process is finished.

When determining that the counter value c is the threshold tc or more ("YES" in Step S200), the counter judgment unit 108 outputs the key update instruction indicating to update the Limited-Number signature generation key and Limited-Number signature verification key to the signature inhibiting unit 151 of the Limited-Number key generation unit 109. When receiving the key update instruction from the counter judgment unit 108, the signature inhibiting unit 151 of the Limited-Number key generation unit 109 generates a private key and a public key in the NTRUSign signature scheme as the Limited-Number signature generation key K and the Limited-Number signature verification key KLVN, respectively (Step S205).

The signature inhibiting unit 151 of the Limited-Number key generation unit 109 updates the private key by overwriting the Limited-Number signature generation key KLG stored in the Limited-Number signature generation key storage unit 103 with the generated Limited-Number signature generation key KLGN (Step S210). That is, the signature inhibiting unit 151 first deletes the Limited-Number signature generation key KLG stored in the Limited-Number signature generation key storage unit 103, and subsequently writes the Limited-Number signature generation key KLGN to the Limited-Number signature generation key storage unit 103 as a new Limited-Number signature generation key KLG.

The signature inhibiting unit 151 of the Limited-Number key generation unit 109 outputs the $2^{nd}$ signature generation instruction to the signature generation unit 105. When receiving the $2^{nd}$ signature generation instruction from the signature inhibiting unit 151, the signature generation unit 105 generates the signature data SKLVN of the Limited-Number signatures verification key KLVN using the user signature generation key KUG stored in the user signature generation key storage unit 101 (Step S215).

The signature generation unit 105 outputs the $2^{nd}$ completion notice to the signature inhibiting unit 151 of the Limited-Number key generation unit 109. When receiving the $2^{nd}$ completion notice from the signature generation unit 105, the signature inhibiting unit 151 of the Limited-Number key generation unit 109 generates the Limited-Number certificate CLN made of the Limited-Number signature verification key KLVN and the signature data SKLVN generated by the signature generation unit 105 (Step S220). At this point, the signature inhibiting unit 151 generates the Limited-Number certificate CLN using the Limited-Number signature verification key KLVN and the signature data SKLVN as a new Limited-Number signature verification key KLV and new signature data SKLV, respectively.

The signature inhibiting unit 151 of the Limited-Number key generation unit 109 updates the certificate by overwriting the Limited-Number certificate CL stored in the Limited-Number certificate storage unit 104 with the generated Limited-Number certificate CLN (Step S225). That is, the signature inhibiting unit 151 deletes the Limited-Number certificate CL stored in the Limited-Number certificate storage unit 104, and subsequently writes the generated Limited-Number certificate CLN to the Limited-Number certificate storage unit 104 as a new Limited-Number certificate CL.

The signature inhibiting unit 151 of the Limited-Number key generation unit 109 outputs the initial value setting instruction to the counter unit 107. When receiving the initial value setting instruction from the signature inhibiting unit 151, the counter unit 107 stores therein the counter value c=0 (Step S230).

1.5 Operation of Signature Verification Apparatus 20

Figure 5:
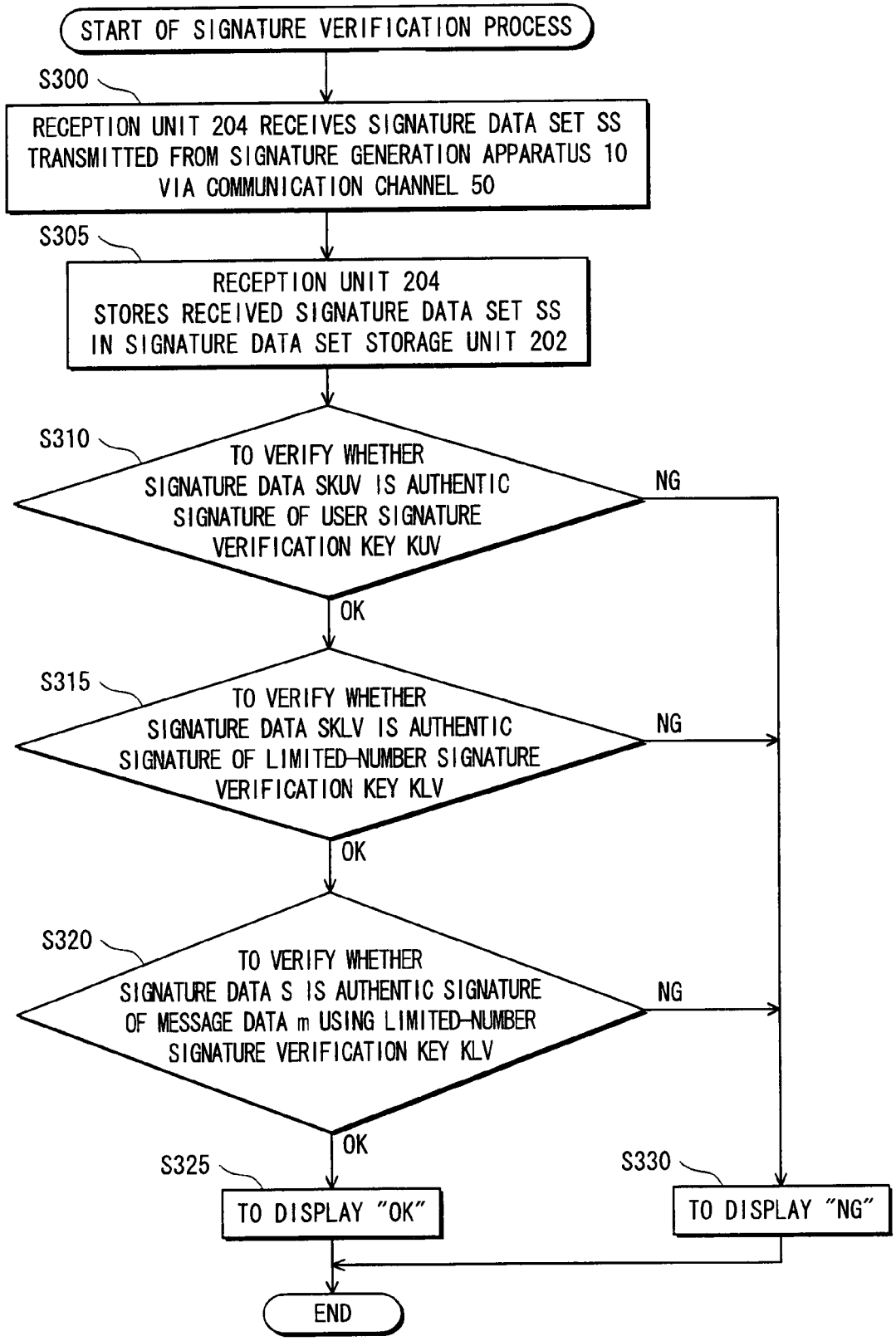
FIG. 5 is a flowchart showing operation of a signature verification process performed in a signature verification apparatus 20.

The signature verification apparatus 20 receives the signature data set SS from the signature generation apparatus 10 via the communication channel 50, and performs a verification of the signature data set SS. The signature verification process performed in the signature verification apparatus 20 is explained with reference to the flowchart of FIG. 5.

The reception unit 204 receives the signature data set SS transmitted form the signature generation apparatus 10 via the communication channel 50 (Step S300).

The reception unit 204 stores the received signature data set SS in the signature data set storage unit 202 (Step S305).

The reception unit 204 outputs the verification start instruction to the signature verification unit 203. The signature verification unit 203 receives the verification start instruction from the reception unit 204. As to the user signature verification key KUV and the signature data SKUV included in the user certificate CU of the signature data set SS, the signature verification unit 203 verifies whether the signature data SKUV is an authentic signature of the user signature verification key KUV, using the CA public key KPC stored in the CA public key storage unit (Step S310).

When verifying that the signature data SKUV is the authentic signature ("OK" in Step S310), the signature verification unit 203 verifies, as to the Limited-Number signature verification key KLV and the signature data SKLV included in the Limited-Number certificate CL of the signature data set SS, whether the signature data SKLV is an authentic signature of the Limited-Number signature verification key KLV, using the user signature verification key KUV (Step S315).

When verifying that the signature data SKLV is the authentic signature ("OK" in Step S315), the signature verification unit 203 verifies, as to the message data m and the signature data S in the signature data set SS, whether the signature data S is an authentic signature of the message data m, using the Limited-number signature verification key KLV (Step S320).

When verifying that the signature data S is the authentic signature ("OK" in Step S320), the signature verification unit 203 displays a message "OK" via the display unit 205 (Step S325).

When determining that the signature data SKUV is not authentic ("NG" in Step S310), that the signature data SKLV is not authentic ("NG" in Step S315), and that the signature data S is not authentic ("NG" in Step S320), the signature verification unit 203 displays a message "NG" via the display unit 205 (Step S330).

1.6 Overall Operation of Embodiment 1

Next is described the overall operation of the digital signature system 1 of Embodiment 1.

In the "signature generation/verification", the signature generation apparatus 10 of the digital signature system 1 generates the signature data set SS for the entered message data m and transmits the signature data set SS to the signature verification apparatus 20; and the signature verification apparatus 20 performs a verification of the signature data set SS for signature data verification and determines whether to accept or reject the signature data set SS based on the verification result. In addition, the signature generation apparatus 10 initializes the Limited-Number signature generation key and Limited-Number certificate in the "initial setting process", and checks the counter value and updates the Limited-Number signature generation key and Limited-Number certificate based on the result from the "counter value checking process".

1.7 Advantageous Effect of Embodiment 1

According to the digital signature system of Embodiment 1, the number of signature data pieces generated with a single Limited-Number signature generation key is counted by the counter unit 107, and the Limited-Number signature generation key is updated when the counter judgment unit 108 determines that the counter value c is the threshold tc or more. Therefore, the total number of signature data pieces generated with one Limited-Number signature generation key can be limited within tc. Since tc is the count of signatures with which transcript attack—n attack technique against the NTRUSign signature scheme—cannot be made a success, the digital signature system 1 is safe from transcript attack.

The certificate of the Limited-Number signature verification key is generated using the user signature generation key. Herewith, when the Limited-Number signature generation key and Limited-Number signature verification key are updated, the user is able to generate a Limited-Number certificate in the user owned signature generation apparatus. In the case where the certificate of the Limited-Number signature verification key is generated in the certificate generation server CA, the user certificate generation key and user certificate are not required to be stored in the signature generation apparatus; however, the user needs to request the certificate of the Limited-Number signature verification key from the certificate generation server CA and therefore has to communicate with the certificate generation server CA each time when the Limited-Number signature generation key and Limited-Number signature verification key are updated. Compared to this, generating the certificate of the Limited-Number signature verification key by using the user signature generation key, as in the case of Embodiment 1, eliminates the need of such communication with the certificate generation server CA.

2. Embodiment 2

A digital signature system 1000 of Embodiment 2 of the present invention is described next with reference to drawings.

2.1 Overview of Digital Signature System 1000

The digital signature system 1000 comprises a signature generation apparatus 1010, a signature verification apparatus 1020, a signature monitoring server 1030, a center 1040 and a communication channel 1050, as shown in FIG. 6.

The signature generation apparatus 1010 generates signature data set SS for message data m, and transmits the signature data set SS to the signature verification apparatus 1020 via the communication channel 1050.

The signature verification apparatus 1020 receives the signature data set SS from the signature generation apparatus 1010 via the communication channel 1050, and performs a verification of the received signature data set SS.

The signature monitoring server 1030 monitors the signature data set SS passing through the communication channel 1050, and when detecting an inauthentic signature data set SS, the signature monitoring server 103 transmits a message indicating the inauthentic signature data set SS being detected to the center 1040 via the communication channel 1050.

The center 1040 receives the message.

2.2 Structure of Signature Generation Apparatus 1010

The signature generation apparatus 1010 comprises, as shown in FIG. 6: a user signature generation key storage unit 1101; a user certificate storage unit 1102; a Limited-Number signature generation key storage unit 1103; a Limited-Number certificate storage unit 1104; a signature generation unit 1105; a signature data set generation unit 1106; a counter unit 1107; a counter judgment unit 1108; a Limited-Number key generation unit 1109; a transmission unit 1110; and a clock unit 1111.

The signature generation apparatus 1010 stores therein a Limited-Number signature generation key, which is a private key used in the NTRUSign signature scheme, and a Limited-Number certificate, which is a public key certificate for a public key corresponding to the private key, and generates signature data S for the message data m entered thereto, using the Limited-Number signature generation key. In addition, the signature generation apparatus 10 counts the number of signature data pieces generated by using the Limited-Number signature generation key, and generates new Limited-Number signature generation key and Limited-Number certificate when the count number is a predetermined threshold tc or more.

Note that the threshold tc is set to the number of signatures with which transcript attack on the NTRUSign signature scheme cannot be made a success, and is $10^{\wedge}7$, for example. The details of the Limited-Number certificate are hereinafter described.

Note that the user signature generation key storage unit 1101, user certificate storage unit 1102, Limited-Number signature generation key storage unit 1103, Limited-Number certificate storage unit 1104, counter unit 1107, counter judgment unit 1108, Limited-Number key generation unit 1109 and transmission unit 1110 structuring the signature generation apparatus 1010 perform similar operations of the user signature generation key storage unit 101, user certificate storage unit 102, Limited-Number signature generation key storage unit 103, Limited-Number certificate storage unit 104, counter unit 107, counter judgment unit 108, Limited-Number key generation unit 109 and transmission unit 110, respectively, of Embodiment 1, and therefore their descriptions are omitted here.

(1) Clock Unit 1111

The clock unit 1111 times (time and date), and has time information TG indicating the current time. The clock unit 1111 times on the second time scale, for example, and the time information is the time elapsed from 0:00, Jan. 1, 1970 (seconds).

(2) Signature Data Set Generation Unit 1106

When receiving the message data m according to a user's operation, the signature data set generation unit 1106 outputs, to the signature generation unit 1105, a $1^{st}$ signature generation instruction indicating to generate signature data for signature target data D which is made up of the message data m, a counter value c and the time information TG.

Subsequently, when receiving the $1^{st}$ completion notice from the signature generation unit 1105, the signature data set generation unit 1106 reads the Limited-Number certificate CL and the user certificate CU from the Limited-Number certificate storage unit 1104 and the user certificate storage unit 1102, respectively. The signature data set generation unit 1106 generates signature data set SS made up of the signature target data D and signature data S of the signature target data D generated by the signature generation unit 1105, the read Limited-Number certificate CL, and the read user certificate CU.

The signature data set generation unit 1106 transmits the generated signature data set SS to the signature verification apparatus 1020 via the transmission unit 1110.

(3) Signature Generation Unit 1105

The signature generation unit 1105 generates the signature data S of the signature target data D and the signature data SKLV of the Limited-Number signature verification key KLV.

<Generation of Signature Data S>

When receiving the $1^{st}$ signature generation instruction from the signature data set generation unit 1106, the signature generation unit 1105 obtains, from the counter unit 1107 and the clock unit 1111, the counter value c held therein and the time information TG showing the current time, respectively.

The signature data set generation unit 1106 generates the signature target data D made up of the message data m, the counter value c, and the time information TG.

The signature data set generation unit 1106 reads the Limited-Number signature generation key KLG stored in the Limited-Number signature generation key storage unit 1103, and generates the signature data S for the generated signature target data D using the read Limited-Number signature generation key KLG—namely, generates the signature data S by performing digital signature operation on the signature target data D.

When the generation of the signature data S is complete, the signature generation unit 1105 outputs the $1^{st}$ completion notice indicating the completion status to the signature data set generation unit 1106.

Note that the signature data S is generated based on the NIRUSign signature scheme.

<Generation of Signature Data SKLV>

When receiving, from the Limited-Number key generation unit 1109, a $2^{nd}$ signature generation instruction indicating to generate the signature data SKLV for the user signature verification key KLV, the signature generation unit 1105 reads the user signature generation key KUG stored in the user signature generation key storage unit 1101, and generates, using the user signature generation key KUG, the signature SKLV for the Limited-Number signature verification key KLV, generated by the Limited-Number key generation unit 1109—namely, generates the signature data SKLV by performing digital signature operation on the Limited-Number signature verification key KLV.

When the generation of the signature data SKLV is complete, the signature generation unit 1105 outputs a $2^{nd}$ completion notice indicating the completion status to the Limited-Number key generation unit 1109.

Note that the signature data SKLV is generated based on the NTRUSign signature scheme.

In the case where the Limited-Number key generation unit 1109 generates the Limited-Number signature verification key KLVN, the signature generation unit 1105 generates the signature data SKLVN by a similar operation described above.

2.3 Structure of Signature Verification Apparatus 1020

The signature verification apparatus 1020 comprises, as shown in FIG. 6: a CA public key storage unit 1201; a signature data set storage unit 1202; a signature verification unit 1203; a reception unit 1204; a display unit 1205; a counter judgment unit 1206; a time judgment unit 1207; and a clock unit 1208.

The CA public key storage unit 1201, signature data set storage unit 1202, reception unit 1204 and display unit 1205 structuring the signature verification apparatus 1020 perform similar operations of the CA public key storage unit 201, signature data set storage unit 202, reception unit 204 and display unit 205, respectively, of Embodiment 1, and therefore their descriptions are omitted here.

(1) Clock Unit 1208

The clock unit 1208 times (time and date), and has time information TV indicating the current time. The clock unit 1208 times on the second time scale, for example, and the time information is the time elapsed from 0:00, Jan. 1, 1970 (seconds).

(2) Counter Judgment Unit 1206

The counter judgment unit 1206 prestores therein the threshold tc.

When receiving a counter judgment instruction indicating to judge the counter value from the signature verification unit 1206, the counter judgment unit 1206 obtains the counter value c included in the signature data set SS and judges whether the obtained counter value c is the threshold tc or more.

When determining that it is the threshold tc or more, the counter judgment unit 1206 outputs a $1^{st}$ judgment result notice indicating accordingly to the signature verification unit 1203.

When determining that it is below the threshold tc, the counter judgment unit 1206 outputs a $2^{nd}$ judgment result notice indicating accordingly to the signature verification unit 1203.

(3) Time Judgment Unit 1207

The time judgment unit 1207 prestores therein a differential threshold TT.

When receiving a time judgment instruction indicating to perform a time judgment from the signature verification unit 1203, the time judgment unit 1207 obtains the time information TG included in the signature data set SS and the time information TV from the clock unit 1208, and judges whether the difference TV-TG between the obtained, time information TG and TV exceeds the differential threshold TT. When determining that the difference TV-TG exceeds the differential threshold TT, the time judgment unit 1207 outputs a $3^{rd}$ judgment result notice indicating accordingly to the signature verification unit 1203.

When determining that the difference TV-TG does not exceed the differential threshold TT, the time judgment unit 1207 outputs a $4^{th}$ judgment result notice indicating accordingly to the signature verification unit 1203.

(4) Signature Verification Unit 1203

The signature verification 1203 performs a verification of the signature data S included in the signature data set SS, the signature data SKLV included in the Limited-Number certificate CL, and the signature data SKUV include din the user certificate CU.

The following describes the examination operation for signature data verification.

The signature verification unit 1203 receives a verification start instruction indicating to start a verification from the reception unit 1204.

The signature verification unit 1203 outputs the counter judgment instruction to the counter judgment unit 1206, and subsequently receives a judgment result from the counter judgment unit 1206.

When receiving the $1^{st}$ judgment result as the judgment result of the counter value c, the signature verification unit 1203 displays a message "NG" indicating to reject the received signature data, set SS via the display unit 1205.

When receiving the $2^{nd}$ judgment result as the judgment result of the counter value c, the signature verification unit 1203 outputs the time judgment instruction to the time judgment unit 1207 and subsequently receives a judgment result from the time judgment unit 1207.

When receiving the $3^{rd}$ judgment result as the result of the time judgment, the signature verification unit 1203 displays a message "NG" indicating to reject the received signature data set SS via the display unit 1205.

When receiving the $4^{th}$ judgment result as the result of the time judgment, the signature verification unit 1203 verifies whether the signature data SKUV is an authentic signature of the user signature verification key KUV using the CA public key KPC stored in the CA public key storage unit.

When verifying that the signature data SKUV is the authentic signature, the signature verification unit 1203 verifies whether the signature data SKLV is an authentic signature of the Limited-Number signature verification key KLV using the user signature verification key KUV.

When verifying that the signature data SKLV is the authentic signature, the signature verification unit 1203 verifies whether the signature data S is an authentic signature of the message data m using the Limited-Number signature verification key KLV.

When verifying that the signature data S is the authentic signature, the signature verification unit 1203 displays a message "OK" indicating to accept the received signature data set SS via the display unit 1205.

When determining that the signature data is not the authentic signature in any of the signature verifications, the signature verification unit 1203 displays a message "NG" indicating to reject the received signature data set SS via the display unit 1205.

2.4 Structure of Signature Monitoring Server 1030

The signature monitoring server 1030 comprises, as shown in FIG. 6: a log storage unit 1301; a communication monitoring unit 1302; a signature data set obtaining unit 1303; a signature data set judgment unit 1304; and transmission and reception unit 1305.

(1) Log Storage Unit 1301

The log storage unit 1301 has an area for storing one or more signature data sets.

(2) Communication Monitoring Unit 1302

The communication monitoring unit 1302 monitors the signature data set SS passing through the communication channel 1050 via the transmission and reception unit 1305.

(3) Signature Data Set Obtaining Unit 1303

When the communication monitoring unit 1302 detects that the signature data set SS is passing through the communication channel 1050, the signature data set obtaining unit 1303 obtains the signature data set passing through the communication channel 1050 via the transmission and reception unit 1305 and communication monitoring unit 1302.

The signature data set obtaining unit 1303 judges whether a signature data set is already stored in the log storage unit 1301.

When determining that no signature data set is stored, the signature data set obtaining unit 1303 stores the obtained signature data set SS in the log storage unit 1301.

When determining that a signature data set is stored, the signature data set obtaining unit 1303 outputs a judgment instruction indicating to judge the legitimacy of the counter value c included in the obtained signature data set to the signature data set judgment unit 1304. The signature data set obtaining unit 1303 receives a judgment result from the signature data set judgment unit 1304.

When receiving a legitimacy notice indicating that the counter value is a legitimate value, the signature data set obtaining unit 1303 stores the obtained signature data set SS in the log storage unit 1301.

When receiving an illegitimacy notice indicating that the counter value is an illegitimate value, the signature data set obtaining unit 1303 transmits a user certificate included in the obtained signature data set SS and a detection message indicating that an illegitimate signature data set has been detected to the center via the transmission and reception unit 1305.

(4) Signature Data Set Judgment Unit 1304

When receiving the judgment instruction from the signature data set obtaining unit 1303, the signature data set judgment unit 1304 judges whether a signature data set SSF which includes the same Limited-Number signature verification key and counter value as those included in the obtained signature data set SS exists in the log storage unit 1301;

When determining that it exists, the signature data set judgment unit 1304 outputs an illegitimacy notice to the signature data set obtaining unit 1303.

When determining that it does not exist, the signature data set judgment unit 1304 outputs a legitimacy notice to the signature data set obtaining unit 1303.

(5) Transmission and Reception Unit 1305

The transmission and reception unit 1305 receives a signature data set passing through the communication channel 1050, and outputs the received signature data set to the signature data set obtaining unit 1303 via the communication monitoring unit 1302.

When receiving a user certificate from the signature data set obtaining unit 1303, the transmission and reception unit 1305 transmits the received user certificate to the center via the communication channel 1050.

2.5 Center 1040

The center 1040 receives a detection message and a user certificate from the signature monitoring server 1030 via the communication channel 1050.

2.6 Operation of Signature Generation Apparatus 1010

The operation of the signature generation apparatus 1010 includes: an "initial setting process" in which initial settings of the Limited-Number signature generation key and Limited-Number certificate are performed; a "signature generation process" in which a signature is generated; and a "counter value checking process" in which a counter value is checked and a Limited-Number signature generation key and a Limited-Number certificate are generated. Since the "initial setting process" and "counter value checking process" are the same as those of Embodiment 1, their explanations are omitted.

(1) Signature Generation Process

Figure 7:
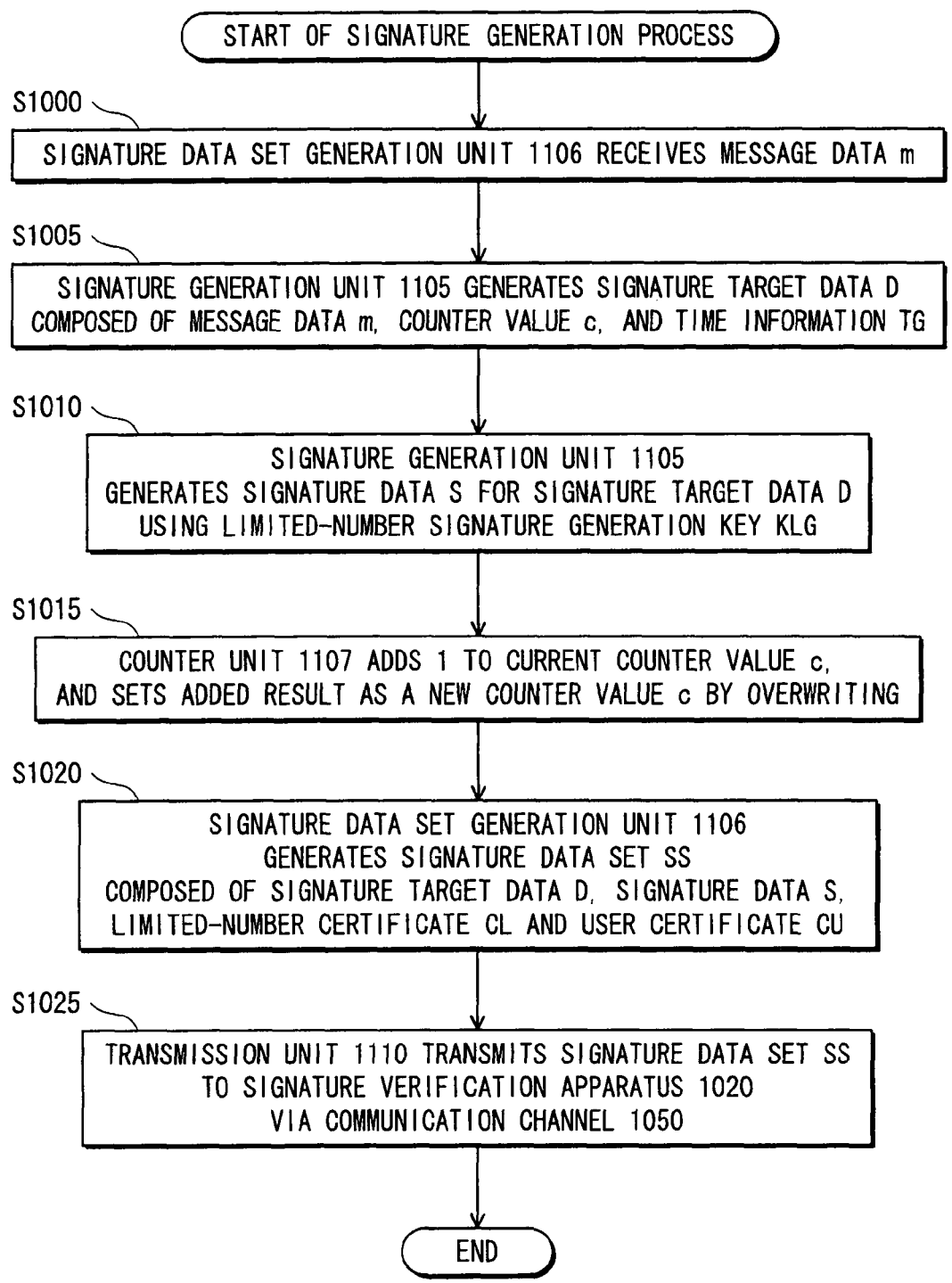
FIG. 7 is a flowchart showing operation of a signature generation process performed in a signature generation apparatus 1010.

The operation of the signature generation process is explained with reference to the flowchart of FIG. 7.

The signature data set generation unit 1106 receives the message data m according to a user's operation (Step S1000).

The signature data set generation unit 1106 outputs a $1^{st}$ signature generation instruction indicating to generate signature data for the signature target data D to the signature generation unit 1105. When receiving the $1^{st}$ signature generation instruction from the signature data set generation unit 1106, the signature generation unit 1105 obtains, from the counter unit 1107 and the clock unit 1111, the counter value c held therein and the time information TG showing the current time, respectively. The signature data set generation unit 1106 generates the signature target data D made up of the message data m, counter value c and time information TG (Step S1005).

The signature generation unit 1105 reads the Limited-Number signature generation key KLG stored in the Limited-Number signature generation key storage unit 1103, and generates the signature data S for the generated signature target data D using the read Limited-Number signature generation key KLG (Step S1010). The counter unit 1107 adds 1 to the counter value c and sets the added result as a new counter value c (Step S1015).

When the generation of the signature data S is complete, the signature generation unit 1105 outputs a $1^{st}$ completion notice indicating the completion status to the signature data set generation unit 1106. When receiving the $1^{st}$ completion notice from the signature generation unit 1105, the signature data set generation unit 1106 reads the Limited-Number certificate CL and user certificate CU from the Limited-Number certificate storage unit 1104 and user certificate storage unit 1102, respectively. The signature data set generation unit 1106 generates the signature data set SS made up of the signature target data D and the signature data S of the signature target data D generated by the signature generation unit 1105, the read Limited-Number certificate CL, and the read user certificate CU (Step S1020).

The transmission unit 1110 transmits the signature data set SS generated by the signature data set generation unit 1106 to the signature verification apparatus 1020 via the communication channel 1050 (Step S1025).

2.7 Operation of Signature Verification Apparatus 1020

The signature verification apparatus 1020 receives the signature data set SS from the signature generation apparatus 1010 via the communication channel 1050, and performs a verification of the signature data set SS. The following describes the signature verification process implemented by the signature verification apparatus 1020 with reference to the flowchart of FIG. 8.

The reception unit 1204 receives the signature data set SS transmitted by the signature generation apparatus 1010 via the communication channel 1050 (Step S1100).

The reception unit 1204 stores the received signature data set SS in the signature data set storage unit 1202 (Step S1105).

The reception unit 1204 outputs a verification start instruction to the signature verification unit 1203. When receiving the verification start instruction, the signature verification unit 1203 outputs a counter judgment instruction to the counter judgment unit 1206. When receiving the counter judgment instruction, the counter judgment unit 1206 obtains the counter value c included in the signature data set SS, and judges whether the obtained counter value c is the threshold tc or more (Step S1110).

When determining that it is the threshold tc or more ("YES" in Step S1110), the counter judgment unit 1206 outputs a $1^{st}$ judgment result notice indicating accordingly to the signature verification unit 1203. When receiving the $1^{st}$ judgment result as the judgment result of the counter value c, the signature verification unit 1203 displays a message "NG" via the display unit 1205 (Step S1140).

When determining that it is below the threshold tc ("NO" in Step S1110), the counter judgment unit 1206 outputs a $2^{nd}$ judgment result notice indicating accordingly to the signature verification unit 1203. When receiving the $2^{nd}$ judgment result as the judgment result of the counter value c, the signature verification unit 1203 outputs the time judgment instruction to the time judgment unit 1207. When receiving the time judgment instruction from the signature verification unit 1230, the time judgment unit 1207 obtains the time information TG included in the signature data set SS and the time information TV from the clock unit 1208, and judges whether the different TV-TG between the obtained time information TG and TV exceeds the differential threshold TT (Step S1115).

When determining that the difference TV-TG exceeds the differential threshold TT ("YES" in Step S1115), the time judgment unit 1207 outputs a $3^{rd}$ judgment result notice indicating accordingly to the signature verification unit 1203. When receiving the $3^{rd}$ judgment result as the result of the time judgment, the signature verification unit 1203 displays a message "NG" via the display unit 1205 (Step S1140).

When determining that the difference TV-TG does not exceed the differential threshold TT ("NO" in Step S1115), the time judgment unit 1207 outputs a $4^{th}$ judgment result notice indicating accordingly to the signature verification unit 1203. When receiving the $4^{th}$ judgment result as the result of the time judgment, the signature verification unit 1203 verifies whether the signature data SKUV is an authentic signature of the user signature verification key KUV using the CA public key KPC stored in the CA public key storage unit (Step S1120).

When verifying that the signature data SKUV is the authentic signature ("OK" in Step S1120), the signature verification unit 1203 verifies, as to the Limited-Number signature verification key KLV and the signature data SKLV included in the Limited-Number certificate CL of the signature data set SS, whether the signature data SKLV is an authentic signature of the Limited-Number signature verification key KLV, using the user signature verification key KUV (Step S1125).

When verifying that the signature data SKLV is the authentic signature ("OK" in Step S1125), the signature verification unit 1203 verifies, as to the message data m and the signature data S of the signature data set SS, whether the signature data S is an authentic signature of the message data m, using the Limited-number signature verification key KLV (Step S1130).

When verifying that the signature data S is the authentic signature ("OK" in Step S1130), the signature verification unit 1203 displays a message "OK" via the display unit 1205 (Step S325).

When determining that the signature data SKUV is not authentic ("NG" in Step S1120), that the signature data SKLV is not authentic ("NG" in Step S1125), and that the signature data S is not authentic ("NG" in Step S1130), the signature verification unit 1203 displays a message "NG" via the display unit 1205 (Step S1140).

2.8 Operation of Signature Monitoring Server 1030

The signature monitoring server 1030 monitors whether a signature data set is passing through the communication channel 1050, and when it is passing, the signature monitoring server 1030 obtains the signature data set SS and compares it with signature data sets already stored. The monitoring process implemented by the signature monitoring server 1030 is explained next with reference to the flowchart of FIG. 9.

The communicator monitoring unit 1302 monitors via the transmission and reception unit 1305 whether the signature data set SS is passing through the communication channel 1050 (Step S1200).

When the communication monitoring unit 1302 does not detect the signature data set SS passing through the communication channel 1050 ("NO" in Step S1200), the monitoring process is finished.

When the communication monitoring unit 1302 detects the signature data set SS passing through the communication channel 1050 ("YES" in Step S1200), the signature data set obtaining unit 1303 obtains the signature data set SS via the transmission and reception unit 1305 and communication monitoring unit 1302 (Step S1205).

The signature data set obtaining unit 1303 judges whether a signature data set is already stored in the log storage unit 1301 (Step S1210).

When determining that no signature data set is stored ("NO" in Step S1210), the signature data set obtaining unit 1303 stores the obtained signature data set SS in the log storage unit 1301 (Step S1215).

When determining that a signature data set is already stored ("YES" in Step S1210), the signature data set obtaining unit 1303 outputs a judgment instruction indicating to judge the legitimacy of the counter value c included in the obtained signature data set to the signature data set judgment unit 1304. When receiving the judgment instruction from the signature data set obtaining unit 1303, the signature data set judgment unit 1304 judges whether the signature data set SSF which includes the same Limited-Number signature verification key and counter value as those included in the obtained signature data set SS exists in the log storage unit 1301 (Step S1220).

When determining that it exists ("YES" in Step S1220), the signature data set judgment unit 1304 outputs the illegitimacy notice to the signature data set obtaining unit 1303. When receiving the illegitimacy notice from the signature data set judgment unit 1304 as the judgment result, the signature data set obtaining unit 1303 outputs the user certificate included in the obtained signature data set SS to the transmission and reception unit 1305. The transmission and reception unit 1305 transmits the user certificate to the center via the communication channel 1050 (Step S1225).

When determining that it does not exist ("NO" in Step S1220), the signature data set judgment unit 1304 outputs the legitimacy notice to the signature data set obtaining unit 1303. When receiving the legitimacy notice from the signature data set judgment unit 1304 as the judgment result, the signature data set obtaining unit 1303 stores the obtained signature data set SS in the log storage unit 1301 (Step S1215).

2.9 Overall Operation of Embodiment 2

Next is described the overall operation of the digital signature system 1000 of Embodiment 2.

In the "signature generation/verification", the signature generation apparatus 1010 of the digital signature system 1000 generates the signature data set SS for the entered message data m and transmits the signature data set SS to the signature verification apparatus 1020; and the signature verification apparatus 1020 performs a verification of the signature data set SS and determines whether to accept or reject the signature data set SS based on the verification result. In addition, the signature generation apparatus 1010 initializes the Limited-Number signature generation key and Limited-Number certificate in the "initial setting process", and checks the counter value and updates the Limited-Number signature generation key and Limited-Number certificate based on the result from the "counter value checking process". Furthermore, the signature monitoring server 1030 monitors whether the signature data set SS is passing through the communication channel 1050. When the signature data set SS is passing, the signature monitoring server 1030 compares the signature data set SS against previous signature data sets.

2.10 Advantageous Effect of Embodiment 2

The digital signature system 1000 of Embodiment 2 is capable of limiting the total number of signature data pieces generated with one Limited-Number signature generation key below tc, as in the case of Embodiment 1.

Furthermore, in Embodiment 2, the counter value is included in the signature target data and verified in the signature verification apparatus 1020, which hence enables the signature verification apparatus 1020 to determine whether the signature generation apparatus 1010 has generated signature data more than the number of times indicated by the counter value.

In addition, the signature monitoring server 1030 checks whether a signature data set including the same counter value and the same Limited-Number signature verification key has previously existed. This prevents failure in counting the number of times of digital signature operation, which could be caused by that signature data is deliberately or mistakenly generated in the signature generation apparatus 1010 twice using the same counter value and the same Limited-Number signature generation key.

Furthermore, the signature generation apparatus 1010 and signature verification apparatus 1020 respectively have a clock, and time information indicating a time when the counter value was used is included in the signature target data. This prevents failure in counting the number of times of digital signature operation, which could be caused by that signature data is generated twice using the same counter value and the same Limited-Number signature generation key as a result of sharing the same counter value.

Accordingly, transcript attack—an attack technique against the NTRUSign signature scheme—cannot be made a success in the digital signature system 1000, which ensures the safety.

3. Modifications

Embodiments 1 and 2 described above are merely the implementation examples of the present invention. The present invention is therefore not limited to these embodiments and can be implemented as embodiments in various forms within the scope of the invention. The following cases, for example, are also included in the present invention.

(1) In the signature verification apparatus of Embodiment 2, "NG" is displayed (output) when the counter value is the threshold tc or more; however, the present invention is not limited to this. The signature verification apparatus may inform the center by transmitting the user certificate when the counter value is the threshold tc or more. Or, instead of the user certificate, an identifier indicating the user of the signature generation apparatus may be transmitted to the center.

(2) In the signature generation apparatus of Embodiment 2, the time information TG indicating the time when the signature was generated is included in the signature target data; instead, time information TGT which indicates a signature verification time limit obtained by adding the threshold TT to the time of the signature generation may be included in the signature target data.

In this case, Step S1115 of FIG. 8 performed by the signature verification apparatus is changed to a step in which a judgment of whether the time information TV obtained from the clock unit of the signature verification apparatus exceeds the time information TGT. The signature verification apparatus implements Step S1140 when determining that it exceeds TGT, and implements Step S1120 when determining that it does not exceed TGT.

(3) In Embodiments 1 and 2, the user certificate is included in the signature data set; the user certificate may not be included in the user certificate, but held by the signature verification apparatus in advance.

(4) In Embodiments 1 and 2, the signature generation apparatus updates, when the counter value c is tc or more, the Limited-Number signature generation key—i.e. overwrites the stored Limited-Number signature generation key with a newly generated Limited-Number signature generation key; however, the present invention is not limited to this. Instead, when the counter value c is tc or more, the signature generation apparatus may stop generating signature data from then onward—i.e. the signature generation apparatus may not be used. In this case, the user certificate and user signature generation key may be spared, and here the Limited-Number certificate may include signature data generated by the signature generation key of the certificate generation server CA for the Limited-Number signature verification key.

(5) In Embodiments 1 and 2, the counter judgment unit of the signature generation apparatus updates, when the counter value c is tc or more, the Limited-Number signature generation key—i.e. overwrites the stored Limited-Number signature generation key with a newly generated Limited-Number signature generation key; however, the present invention is not limited to this. The signature generation apparatus may store therein multiple Limited-Number signature generation keys, and comprise an information storage unit storing therein "use Limited-Number signature generation key information" which is information indicating a Limited-Number signature generation key to be used and an information update unit for updating the use Limited-number signature generation key information. Here, the signature generation apparatus may update the use Limited-Number signature generation key information when the counter value c is tc or more.

Note that, here, Limited-Number signature verification keys corresponding to the respective Limited-Number signature generation keys should be different from each other. Then, Limited-Number certificates corresponding to the respective Limited-Number signature verification keys should be associated with the Limited-Number signature generation keys corresponding to the Limited-Number signature verification keys included in the Limited-Number certificates and stored the Limited-Number certificate storage unit.

In this case, the signature generation apparatus generates signature data using a Limited-Number signature generation key indicated by the use Limited-Number signature generation key information stored in the information storage unit, and generates a signature data set made up of the generated signature data, the Limited-Number certificate corresponding to the Limited-Number signature generation key used for the generation, and the user certificate. The signature generation apparatus transmits the generated signature data set to the signature verification apparatus.

Alternatively, only one key is provided as a Limited-Number signature verification key corresponding to the respective Limited-Number signature generation keys. That is, the Limited-Number signature verification key may be a key corresponding to all the Limited-Number signature generation keys.

(6) As a signature scheme, Embodiments 1 and 2 use the NIRUSign; however, other signature scheme—for example, the RSA signature scheme, the RSA-PSS signature scheme, or the elliptic DSA signature scheme—may be used instead.

(7) In Embodiment 1, the counter judgement unit of the signature generation apparatus checks the counter value when the signature data S is generated; however, the present invention is not limited to this.

The counter judgment unit of the signature generation apparatus may periodically check the counter value. Or alternatively, the counter judgment unit 108 may check the counter value in response to an instruction from the user.

(8) In Embodiment 2, the center receives only a message indicating the detection of an inauthentic signature data set and a user certificate; however, the present invention is not limited to this.

The center may store therein one or more received user certificates, and generate a revocation list of user signature verification keys included in the stored user certificates. Here, the center transmits the generated revocation list to the signature verification apparatus.

In this case, after receiving the revocation list from the center, the signature verification apparatus stores therein the received revocation list. When receiving a signature data set from the signature generation apparatus, the signature verification apparatus obtains a user certificate included in the received signature data set, and judges whether a user signature verification key included in the obtained user certificate is listed in the stored revocation list. When determining that it is listed, the signature verification apparatus displays a message "NG". When determining that it is not listed, the signature verification apparatus implements Step S1105 and the subsequent steps shown in FIG. 8.

(9) In Embodiment 1, the threshold prestored in the counter judgment unit of the signature generation apparatus is fixed; however, the present invention is not limited to this and the threshold can vary.

For example, when receiving a threshold tc' according to a user's operation, the signature generation apparatus updates the threshold tc stored in its own counter judgment unit by overwriting with the received threshold tc'. Thus, the threshold can be changed.

Alternatively, the signature generation apparatus changes the threshold periodically to make the threshold variable.

(10) In Embodiment 2, the threshold prestored in the counter judgment unit of the signature generation apparatus is fixed; however, the present invention is not limited to this and the threshold can vary.

An example of the operation performed to make the threshold variable is described here. When receiving a threshold tc' according to a user's operation, the signature generation apparatus updates the threshold tc stored in its own counter judgment unit by overwriting with the received threshold tc'. The signature generation apparatus transmits the received threshold tc' to the signature verification apparatus. When receiving the threshold tc' from the signature generation apparatus, the signature verification apparatus updates the threshold stored in the counter judgment unit of the signature verification apparatus by overwriting with the received threshold tc'.

The following operation may be employed instead. The signature generation apparatus changes the threshold periodically and transmits the changed threshold to the signature verification apparatus. When receiving the changed threshold, the signature verification apparatus updates the threshold stored in the its own counter judgment unit by overwriting with the received threshold tc'.

(11) In Embodiment 1, the signature generation apparatus sets 0 to the counter as the initial value; however, the present invention is not limited to this. The signature generation apparatus may set 1 to the counter as the initial value. In this case, the signature generation apparatus judges whether the counter value c exceeds the threshold tc, and when determining that it is the threshold tc or more, the signature generation apparatus updates the Limited-Number signature generation key and Limited-Number certificate.

Also, in Embodiment 2, the signature generation apparatus may set 1 to the counter as the initial value. In this case, the signature generation apparatus judges whether the counter value c is the threshold tc or more, and when determining that it is the threshold tc or more, the signature generation apparatus updates the Limited-Number signature generation key and Limited-Number certificate. The signature verification apparatus judges whether the received counter value c exceeds the threshold tc. The signature verification apparatus displays (outputs) "NG" when determining that it is the threshold or more, and performs a judgment of the time information when determining it is below the threshold.

(12) In Embodiment 2, the signature generation apparatus adds 1 to the counter value after the generation of the signature data S; however, the present invention is not limited to this.

The signature generation apparatus adds 1 to the counter value before generating the signature target data D. That is, in the signature generation process shown in FIG. 7, the signature generation apparatus first implements Step S1000, which is then followed by S1015, and subsequently carries out the process in the order of Steps S1005, S1010, S1020 and S1025.

Also here the signature generation apparatus may perform the counter value checking-process before the generation of the signature data. In this case, when determining that the counter value is a predetermined value or more, the signature generation apparatus generates a new Limited-Number signature generation key and a new Limited-Number certificate, and generates signature data for signature target data using the generated new Limited-Number signature generation key. Then, the signature generation apparatus generates signature data set made up of the signature target data, the generated signature data, the generated new Limited-Number certificate and a user certificate.

(13) In Embodiment 1, the signature generation apparatus may add 1 to the counter value before the generation of the signature data S.

Also here the signature generation apparatus may perform the counter value checking process before the generation of the signature data. In this case, when determining that the counter value is a predetermined value or more, the signature generation apparatus generates a new Limited-Number generation key and a new Limited-Number certificate, and generates signature data for message data using the generated new Limited-Number signature generation key. Then, the signature generation apparatus generates a signature data set made up of the message data, the generated signature data, the generated new Limited-Number certificate and a user certificate.

(14) In Embodiment 2, the signature, generation apparatus generates, for signature target data D, the signature data S made up of the message data m, the counter value c and the time information TG; however, the present invention is not limited to this.

The signature generation apparatus may generate the signature data S for the message data m. In this case, the signature generation apparatus transmits, to the signature verification apparatus: data D made up of the message data m, the counter value c and the time information TG; the signature data S; the Limited-Number certificate CL; and the user certificate CU.

(15) In Embodiment 2, the signature generation apparatus transmits, to the signature verification apparatus, the signature target data D made up of the message data m; the counter value c, and the time information TG, the signature data S for the signature target data D, the Limited-Number certificate CL, and the user certificate CU; however, the present invention is not limited to this.

The signature generation apparatus may transmit, to the signature verification apparatus, the signature target data D made up of the message data m and the counter value c, the signature data S for the signature target data D, the Limited-Number certificate CL, and the user certification CU. In this case, Step S1115 shown in FIG. 8 is omitted from the signature verification process implemented in the signature verification apparatus.

Alternatively, the signature generation apparatus may transmit, to the signature verification apparatus, the signature target data D made up of the message data m and the time information TG, the signature data S for the signature target data D, the Limited-Number certificate CL, and the user certificate CU. In this case, Step S1110 shown in FIG. 8 is omitted from the signature verification process implemented in the signature verification apparatus.

(16) In Embodiment 1, the signature generation apparatus receives message data according to a user's operation; however, the present invention is not limited to this.

The signature generation apparatus may receive message data from an external apparatus.

Also, in Embodiment 2, the signature generation apparatus may receive message data from an external apparatus.

(17) In Embodiment 1, the counter unit of the signature generation apparatus adds 1 to the holding counter value; however, the present invention is not limited to this. The counter unit of the signature generation apparatus may add a different value or multiply the counter value by a different value. In the case of multiplication, the initial value of the counter is, for example, 1.

Also, in Embodiment 2, the counter unit of the signature generation apparatus may add a different value or multiply the counter value by a different value. In the case of multiplication, the initial value of the counter is, for example, 1.

(18) The present invention may be a combination of these embodiments and modifications above.

<Other Modifications>

Note that the present invention has been described based on the above embodiments, however, it is a matter of course that the present invention is not limited to the above embodiments. The following cases are also within the scope of the present invention.

(1) Each apparatus above is, specifically speaking, a computer system made up of a microprocessor, a ROM, a RAM, a hard disk unit, a display unit, a keyboard, a mouse and the like. A computer program is stored in the RAM or the hard disk unit. The microprocessor operates according to the computer program, and thereby each apparatus fulfills the functions. Here, the computer program is composed of combined multiple instruction codes which are command to the computer system to achieve predetermined functions.

(2) Part or all of the components making up the above individual devices may be assembled as a single system LSI (Large Scale Integration). The system LSI is an ultra-multi-functional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

(3) Part or all of the components making up the above individual devices may be assembled as an IC card or a stand-alone module detachable from each device. The IC card and the module are computer systems composed of a microprocessor, ROM, RAM, and the like. These IC card and module may include the above-mentioned ultra-multifunctional LSI. The microprocessor operates according to a computer program, and thereby the IC card or the module accomplishes its function. Additionally, the IC card and module may have a tamper resistance.

(4) The present invention may be a method of accomplishing the above described inauthentic contents detection system. The present invention may be a computer program that achieves the method by a computer, or may be a digital signal representing the computer program.

The present invention may also be achieved by a computer-readable recording medium, such as a flexible disk, a hard disk, a CD-ROM (Compact Disk Read Only Memory), MO (Magneto-optical) disk, a DVD, a DVD-ROM (Digital Versatile Disk Read Only Memory), a DVD-RAM (Digital Versatile Disk Random Access Memory), a BD (Blu-ray Disk), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(5) The present invention includes a structure in which two or more of the above embodiments and modifications are combined.

4. Summary

The present invention is a signature generation apparatus for generating a signature data piece for signature target data including therein message data. The signature generation apparatus comprises: a Limited-Number signature generation key storage unit storing therein a Limited-Number signature generation key used for generating the signature data piece; a signature generation unit operable to generate the signature data piece for the signature target data using the Limited-Number signature generation key stored in the Limited-Number signature generation key storage unit; a counter unit operable to count the number of signature data pieces generated in the signature generation unit using the Limited-Number signature generation key; and a $1^{st}$ counter judgment unit operable to perform a judgment on a counter value of the counter unit. Here, the $1^{st}$ counter judgment unit prevents the signature generation unit from generating the signature data piece when the counter value is larger than a predetermined value.

In this case, the signature generation apparatus may further comprise a key generation unit operable to generate a new Limited-Number signature generation key. Here, when the counter value is larger than the predetermined value, the $1^{st}$ counter judgment unit causes the key generation unit to generate the new Limited-Number signature generation key, which is then stored in the Limited-Number signature generation key storage unit as the Limited-Number signature generation key.

In this case, when the counter value is larger than the predetermined value, the $1^{st}$ counter judgment unit may cause the key generation unit to generate the new Limited-Number, signature generation key, and update the Limited-Number signature stored in the Limited-Number signature generation key storage unit by overwriting with the new Limited-Number signature generation key.

In this case, multiple Limited-Number signature generation keys may be present. Here, the signature generation apparatus further comprises: a use Limited-Number signature generation key information storage unit storing therein use Limited-Number signature generation key information indicating a use Limited-Number signature generation key that is, among the Limited-Number signature generation keys, a Limited-Number signature generation key to be used; and a use Limited-Number signature generation key information update unit operable to update the use Limited-Number signature generation key information of the use Limited-Number signature generation key information storage unit. Here, when the counter value is larger than the predetermined value, the $1^{st}$ counter judgment unit causes the use Limited-Number signature generation key information update unit to update the use Limited-Number signature generation key information.

In this case, the signature generation apparatus may further comprise: a Limited-Number certificate storage unit storing a certificate for a Limited-Number signature verification key used for verifying the signature data piece corresponding to the Limited-Number signature generation key; and a user signature generation key storage unit storing a user signature generation key used for generating the Limited-Number certificate. Here, the key generation unit generates the Limited-Number signature generation key and the Limited-Number certificate corresponding to the Limited-Number signature generation key, and stores the Limited-Number signature generation key and the Limited-Number certificate in the Limited-Number signature generation key storage unit and the Limited-Number certificate storage unit, respectively.

In this case, when the counter value is larger than the predetermined value, the $1^{st}$ counter judgment unit may cause the key generation unit to generate a new Limited-Number signature generation key and a new Limited-Number certificate corresponding to the new Limited-Number signature generation key, and update the Limited-Number signature generation key stored in the Limited-Number signature generation key storage unit and the Limited-Number certificate stored in the Limited-Number certificate storage unit by overwriting with the new Limited-Number signature generation key and the new Limited-Number certificate, respectively.

In this case, the signature generation unit may generate the signature data corresponding to the signature target data including the message data and a counter value indicated by the counter unit, using the signature generation key stored in the signature generation key storage unit.

In this case, the signature apparatus may further comprise a $1^{st}$ clock holding time information, and the signature target data may further include the time information held by the $1^{st}$ clock.

In addition, the present invention is a signature verification apparatus for verifying signature data piece for signature target data including message data and a counter value. The signature verification apparatus comprises: a Limited-Number certificate storage unit storing a Limited-Number signature verification key used for verifying the signature data piece, or a certificate for the Limited-Number signature verification key; a signature verification unit operable to verify the signature data piece for the signature target data using the Limited-Number signature verification key stored in the Limited-Number signature verification key storage unit; and a $2^{nd}$ counter judgment unit operable to perform a judgment on the counter value included in the signature target data. Here, when the counter value is larger than a predetermined value, the $2^{nd}$ counter judgment unit prevents the signature verification unit from verifying the signature data piece.

In this case, the signature verification apparatus may further comprise a notification unit operable to notify a center of information. Here, when the counter value is larger than the predetermined value, the $2^{nd}$ counter judgment unit causes the notification unit to notify the center of the signature verification key or an identifier of the signature verification.

In this case, the signature verification apparatus may further comprise a $2^{nd}$ clock holding $2^{nd}$ time information and a time judgment unit operable to perform a judgment on time information. Here, the signature target data further includes the $1^{st}$ time information, and the time judgment unit compares the $1^{st}$ time information and the $2^{nd}$ time information. When a time difference obtained by subtracting the $1^{st}$ time information from the $2^{nd}$ time information is larger than a predetermined value, the time judgment unit prevents the signature verification unit from verifying the signature data piece.

In this case, the signature verification apparatus may further comprise a $2^{nd}$ clock holding $2^{nd}$ time information and a time judgment unit operable to perform a judgment on time information. Here, the signature target data further includes the $1^{st}$ time information, and the time judgment unit compares the it time information and the $2^{nd}$ time information. When a time difference obtained by subtracting the $1^{st}$ time information from the $2^{nd}$ time information is larger than a predetermined value, the time judgment unit causes the notification unit to notify the center of the signature verification key or the identifier of the signature verification key.

In addition, the present invention is a digital signature system comprising: a signature generation apparatus for generating a signature data piece for signature target data including message data and a counter value; and a signature verification apparatus for verifying the signature data piece. The signature generation apparatus includes a Limited-Number signature generation key storage unit storing a Limited-Number signature generation key used for generating the signature data piece; a signature generation unit operable to generate the signature data piece for the signature target data using the Limited-Number signature generation key stored in the Limited-Number signature generation key storage unit; a counter unit operable to count the number of signature data pieces generated in the signature generation unit using the Limited-Number signature generation key; and a $1^{st}$ counter judgment unit operable to perform a judgment on a counter value of the counter unit. The signature verification apparatus includes: a Limited-Number certificate storage unit storing a Limited-Number signature verification key used for verifying the signature, data piece, or a certificate for the Limited-Number signature verification key; and a signature verification unit operable to verify the signature data piece for the signature target data using the Limited-Number signature verification key stored in the Limited-Number signature verification key storage unit; and a $2^{nd}$ counter judgment unit operable to perform a judgment on the counter value included in the signature target data. Here, the $1^{st}$ counter judgment unit prevents the signature generation unit from generating the signature data piece when the counter value is larger than a predetermined value, and when the counter value is larger than a predetermined value, the $2^{nd}$ counter judgment unit prevents the signature verification unit from verifying the signature data piece.

In this case, the digital signature system may further comprise: a signature monitoring server for monitoring a signature data set including the signature target data and the signature data; and a center for receiving a notice of monitoring result information from the signature monitoring server. Furthermore, the signature monitoring server may include: a signature data set obtaining unit operable to obtain the signature data set; a signature data set log storage unit storing therein a signature data set log containing previous signature data sets; and a signature data set judging unit operable to judge the signature data set. Here, the signature data set judgment unit makes the judgment by comparing the signature data set obtained by the signature data set obtaining unit and the signature data set log, generates the monitoring result information based on the judgment result, and notifies the center of the monitoring result information.

In this case, the signature data set judgment unit may compare a counter value included in the signature target data of the signature data set and a counter value included in the signature target data of the previous signature data set stored in the signature data set log storage unit. The present invention is a signature generation method of generating a signature data piece for signature target data including message data. The signature generation method comprises the steps of: (a) storing therein a Limited-Number signature generation key used for generating the signature data piece; (b) generating the signature data piece for the signature target data using the Limited-Number signature generation key stored in the step (a); (c) counting the number of signature data pieces generated in the step (b) using the Limited-Number signature generation key; and (d) performing a judgment on a counter value counted in the step (c). Here, when the counter value is larger than a predetermined value, it is prevented to generate the signature data piece.

The present invention is also a signature verification method of verifying a signature data piece for signature target data including message data and a counter value. The signature verification method comprises the steps of: (a) storing a Limited-Number signature verification key used for verifying the signature data piece, or a certificate for the Limited-Number signature verification key; (b) verifying the signature data piece for the signature target data using the Limited-Number signature verification key stored in the step (a); and (c) performing a judgment on the counter value included in the signature target data. Here, when the counter value is larger than a predetermined value, it is prevented to verify the signature in the step (b).

The present invention is also a program causing a signature generation apparatus to generate a signature data piece for signature target data including message data. The program causes the signature generation apparatus to execute the steps of: (a) storing therein a Limited-Number signature generation key used for generating the signature data piece; (b) generating the signature data piece for the signature target data using the Limited-Number signature generation key stored in the step (a); (c) counting the number of signature data pieces generated in the step (b) using the Limited-Number signature generation key; and (d) performing a judgment on a counter value counted in the step (c). Here, when the counter value is larger than a predetermined value, it is prevented to generate the signature data piece.

The present invention is also a program causing a signature verification apparatus to verify a signature data piece for signature target data including message data and a counter value. The program causes the signature verification apparatus to execute the steps of: (a) storing a Limited-Number signature verification key used for verifying the signature data piece, or a certificate for the Limited-Number signature verification key; (b) verifying the signature data piece for the signature target data using the Limited-Number signature verification key stored in the step (a); and (c) performing a judgment on the counter value included in the signature target data. Here, when the counter value is larger than a predetermined value, it is prevented to verify the signature in the step (b).

The present invention is also an integrated circuit of a signature generation apparatus for generating signature data piece for signature target data including therein message data. The integrated circuit comprises: a Limited-Number signature generation key storage unit storing therein a Limited-Number signature generation key used for generating the signature data piece; a signature generation unit operable to generate the signature data piece for the signature target data using the Limited-Number signature generation key stored in the Limited-Number signature generation key storage unit; a counter unit operable to count the number of signature data pieces generated in the signature generation unit using the Limited-Number signature generation key; and a $1^{st}$ counter judgment unit operable to perform a judgment on a counter value of the counter unit. Here, the $1^{st}$ counter judgment unit prevents the signature generation unit from generating the signature data piece when the counter value is larger than a predetermined value.

The present invention is also an integrated circuit of a signature verification apparatus for verifying a signature data piece for signature target data including therein message data and a counter value. The integrated circuit comprises: a Limited-Number certificate storage unit storing a Limited-Number signature verification key used for verifying the signature data piece, or a certificate for the Limited-Number signature verification key; a signature verification unit operable to verify the signature data piece for the signature target data using the Limited-Number signature verification key stored in the Limited-Number signature verification key storage unit; and a $2^{nd}$ counter judgment unit operable to perform a judgment on the counter value included in the signature target data. Here, when the counter value is larger than a predetermined value, the $2^{nd}$ counter judgment unit prevents the signature verification unit from verifying the signature data piece.

INDUSTRIAL APPLICABILITY

According to the structure of the digital signature system above, transcript attack can be prevented.

In addition, each apparatus consisting the digital signature system can be manufactured and marketed operationally, continuously and repeatedly electric equipment manufacturing industries.

The invention claimed is:
1. A signature generation apparatus for performing a digital signature operation with use of a signature key, comprising:
    a key storage unit storing therein the signature key;
    a signature generation unit operable to perform the digital signature operation on signature target data with the use of the signature key to generate signature data;
    a counter unit operable to count a cumulative count of digital signature operations having been performed by the signature generation unit with the use of the signature key;
    a judgment unit operable to judge whether the cumulative count has reached a predetermined count; and
    a signature inhibition unit operable to, in a case where the judgment unit determines that the cumulative count has reached the predetermined count, inhibit the use of the signature key in the digital signature operation from then onward,
    wherein the signature inhibition unit generates a different signature key and overwrites the signature key stored in the key storage unit with the different signature key to inhibit the use of the signature key in the digital signature operation,
    wherein the signature generation apparatus further comprises:
        a verification key certificate storage unit storing therein a verification key certificate including (i) a verification key corresponding to the signature key and (ii) verification key signature data indicating authenticity of the verification key and which is generated by a $1^{st}$ private key;
        a public key certificate storage unit storing therein a public key certificate including (i) a public key corresponding to the $1^{st}$ private key and (ii) public key signature data indicating authenticity of the public key and which is generated by a $2^{nd}$ private key held by an outside functional entity; and
        a transmission unit operable to transmit the signature target data, the signature data generated by the signature generation unit, the verification key certificate, and the public key certificate to a signature verification apparatus that performs a verification of the signature data, and
    wherein the signature inhibition unit, in order to inhibit the use of the signature key in the digital signature operation, (i) generates a different verification key that corresponds to the different signature key, (ii) generates different verification key signature data for the different verification key using the $1^{st}$ private key, (iii) generates a different verification key certificate that includes the different verification key and the different verification key signature data, and (iv) overwrites the verification key certificate stored in the public key certificate storage unit with the different verification key certificate.

2. The signature generation apparatus of claim 1, further comprising:
    an information storage unit storing therein $1^{st}$ key information indicating the signature key, wherein
    the signature generation unit obtains the signature key from the key storage unit based on the $1^{st}$ key information and generates the signature data using the obtained signature key,
    the key storage unit further stores therein a different signature key, and
    the signature inhibition unit rewrites the $1^{st}$ key information stored in the information storage unit with $2^{nd}$ key information indicating the different signature key to inhibit the use of the signature key in the digital signature operation.

3. The signature generation apparatus of claim 1, wherein the signature generation unit obtains the cumulative count, and
the signature target data includes therein message data and the obtained cumulative count.

4. The signature generation apparatus of claim 1, further comprising:
a clock unit operable to time, wherein
the signature generation unit obtains time information used as a standard of judgment for a time limit of validity of the signature data, and
the signature target data includes therein message data and the obtained time information.

5. The signature generation apparatus of claim 1, wherein the judgment unit includes a count storage subunit storing therein the predetermined count, and
the signature generation apparatus further comprises:
an update unit operable to update the predetermined count stored in the count storage subunit to a different predetermined count.

6. A signature verification apparatus for performing a verification of signature data generated by a signature generation apparatus that performs a digital signature operation with use of a signature key, the signature verification apparatus comprising:
a reception unit operable to receive, from the signature generation apparatus, (i) signature target data including message data and a cumulative count of digital signature operations having been performed by the signature generation apparatus and (ii) the signature data which corresponds to the signature target data;
a count judgment unit operable to judge whether the cumulative count has reached a predetermined count; and
a verification inhibition unit operable to inhibit the verification of the signature data in a case where the count judgment unit determines that the cumulative count has reached the predetermined count,
wherein the signature target data further includes $1^{st}$ time information used as a standard of judgment for a time limit of validity of the signature data,
wherein the signature verification apparatus further comprises:
a clock unit operable to time
a time limit judgment unit operable to, in a case where the judgment unit determines that the cumulative count has not reached the predetermined count, obtain $2^{nd}$ time information indicating a current time using the clock unit and judge whether the time limit of validity has expired using the $1^{st}$ time information and the $2^{nd}$ time information; and
a verification unit operable to verify the signature data in a case where the time judgment unit determines that the time limit of validity has not expired,
wherein the verification inhibition unit inhibits the verification of the signature data in a case where the time limit judgment unit determines that the time limit has expired,
wherein the signature data is generated using the signature key generated by the signature generation apparatus,
wherein the reception unit further receives (i) a verification key certificate including a verification key corresponding to the signature key and verification key signature data indicating authenticity of the verification key and which is generated by a $1^{st}$ private key, and (ii) a public key certificate including a $1^{st}$ public key corresponding to the $1^{st}$ and public key signature data indicating authenticity of the $1^{st}$ public key and which is generated by a $2^{nd}$ private key held by an outside functional entity, and
wherein the verification unit includes:
a key storage unit storing therein a $2^{nd}$ public key corresponding to the $2^{nd}$ private key;
a $1^{st}$ verification unit operable to, in the case where the time limit judgment unit determines that the time limit has expired, perform a verification of authenticity of the public key certificate, using the $2^{nd}$ public key;
a $2^{nd}$ verification unit operable to, in a case where the authenticity of the public key certificate is verified, perform a verification of authenticity of the verification key certificate, using the $1^{st}$ public key; and
a $3^{rd}$ verification unit operable to, in a case where the authenticity of the verification key certificate is verified, perform a verification of authenticity of the signature data.

7. The signature verification apparatus of claim 6, further comprising:
a transmission unit operable to, in the case where the count judgment unit determines that the cumulative count has reached the predetermined count, transmit specification information specifying the signature generation apparatus that has generated the signature data to an external apparatus.

8. The signature verification apparatus of claim 6, wherein the count judgment unit includes a count storage area which stores therein the predetermined count, and
the signature verification apparatus further comprises:
an update unit operable to receive a different predetermined count from the signature generation apparatus and update the predetermined count stored in the count judgment unit to the different predetermined count.

9. A signature system comprising; a signature generation apparatus for performing a digital signature operation with use of a signature key; and a signature verification apparatus for performing a verification of signature data generated by the signature generation apparatus,
wherein the signature generation apparatus includes:
a key storage unit storing therein the signature key;
a signature generation unit operable to perform, with the use of the signature key, the digital signature operation on signature target data including message data, and a cumulative count of digital signature operations having been performed by the signature generation unit using the signature key, to generate the signature data;
a counter unit operable to count the cumulative count;
a judgment unit operable to judge whether the cumulative count has reached a predetermined count;
a signature inhibition unit operable to, in a case where the judgment unit determines that the cumulative count has reached the predetermined count, inhibit the use of the signature key in the digital signature operation from then onward; and
a transmission unit operable to transmit a data group including the signature target data and the signature data to the signature verification apparatus,
wherein the signature verification apparatus includes:
a reception unit operable to receive the data group;
a count judgment unit operable to judge whether the cumulative count included in the signature target data of the received data group has reached a predetermined count; and
a verification inhibition unit operable to inhibit the verification of the signature data in a case where the count judgment unit determines that the cumulative count has reached the predetermined count, wherein the signature system further comprises a monitoring apparatus for monitoring the data group transmitted from the signature generation apparatus to the signature verification apparatus, and wherein the monitoring apparatus includes:
- an obtaining unit operable to obtain the data group from a transmission channel connecting the signature generation apparatus and the signature verification apparatus;
- a log storage unit storing therein one or more data groups previously obtained prior to the data group being obtained;
- a data judgment unit operable to judge whether the obtained data group is authentic, using the previously-obtained data groups; and
- an information transmission unit operable to, in a case where the data judgment unit determines that the obtained data group is not authentic, transmit specification information specifying the signature generation apparatus that has generated the signature data included in the obtained data group to an external apparatus.

10. The signature system of claim 9, wherein the data group further includes a verification key corresponding to the signature key, the previously-obtained data groups each have previously-obtained signature target data including a previously-obtained cumulative count and a previously-obtained verification key, and the data judgment unit judges authenticity of the obtained data group based on a search, among the previously-obtained data groups in the log storage unit, for a matching data group whose previously-obtained signature target data includes a previously-obtained verification key and a previously-obtained verification key matching the verification key and the cumulative count, respectively, of the obtained data group, and determines that the obtained data group is not authentic in a case where the matching data group is found in the search.

11. A signature generation method used on a signature generation apparatus that performs a digital signature operation with use of a signature key, wherein the signature generation apparatus includes a key storage unit storing therein the signature key, the signature generation method comprising:
- a signature generation step of performing the digital signature operation on signature target data by the signature generation step with the use of the signature key to generate signature data;
- a counter step of counting a cumulative count of digital signature operations having been performed with the use of the signature key;
- a judgment step of judging whether the cumulative count has reached a predetermined count; and
- a signature inhibition step of, in a case where the cumulative count is determined to have reached the predetermined count in the judgment step, inhibiting the use of the signature key in the digital signature operation from then onward, wherein the signature inhibition step generates a different signature key and overwrites the signature key stored in the key storage unit with the different signature key to inhibit the use of the signature key in the digital signature operation, wherein the signature generation apparatus further comprises:
- a verification key certificate storage unit storing therein a verification key certificate including (i) a verification key corresponding to the signature key and (ii) verification key signature data indicating authenticity of the verification key and which is generated by a $1^{st}$ private key; and
- a public key certificate storage unit storing therein a public key certificate including (i) a public key corresponding to the $1^{st}$ private key and (ii) public key signature data indicating authenticity of the public key and which is generated by a $2^{nd}$ private key held by an outside functional entity, wherein the signature generation method further comprises:
- a transmission step of transmitting the signature target data, the signature data generated by the signature generation step, the verification key certificate, and the public key certificate to a signature verification apparatus that performs a verification of the signature data, and wherein the signature inhibition step, in order to inhibit the use of the signature key in the digital signature operation, (i) generates a different verification key that corresponds to the different signature key, (ii) generates different verification key signature data for the different verification key using the $1^{st}$ private key, (iii) generates a different verification key certificate that includes the different verification key and the different verification key signature data, and (iv) overwrites the verification key certificate stored in the public key certificate storage unit with the different verification key certificate.

12. A non-transitory computer readable recording medium having stored thereon a signature generation program used on a signature generation apparatus that performs a digital signature operation with use of a signature key, the signature generation apparatus including a key storage unit storing therein the signature key, wherein, when executed, the signature generation program causes the signature generation apparatus to perform a signature generation method comprising:
- a signature generation step of performing the digital signature operation on signature target data with the use of the signature key to generate signature data;
- a counter step of counting a cumulative count of digital signature operations having been performed with by the signature generation step the use of the signature key;
- a judgment step of judging whether the cumulative count has reached a predetermined count; and
- a signature inhibition step of, in a case where the cumulative count is judged to have reached the predetermined count in the judgment step, inhibiting the use of the signature key in the digital signature operation from then onward, wherein the signature inhibition step generates a different signature key and overwrites the signature key stored in the key storage unit with the different signature key to inhibit the use of the signature key in the digital signature operation, wherein the signature generation apparatus further comprises:
- a verification key certificate storage unit storing therein a verification key certificate including (i) a verification key corresponding to the signature key and (ii)

verification key signature data indicating authenticity of the verification key and which is generated by a $1^{st}$ private key; and a public key certificate storage unit storing therein a public key certificate including (i) a public key corresponding to the $1^{st}$ private key and (ii) public key signature data indicating authenticity of the public key and which is generated by a $2^{nd}$ private key held by an outside functional entity, wherein the signature generation method further comprises:

a transmission step of transmitting the signature target data, the signature data generated by the signature generation step, the verification key certificate, and the public key certificate to a signature verification apparatus that performs a verification of the signature data, and wherein the signature inhibition step, in order to inhibit the use of the signature key in the digital signature operation, (i) generates a different verification key that corresponds to the different signature key, (ii) generates different verification key signature data for the different verification key using the $1^{st}$ private key, (iii) generates a different verification key certificate that includes the different verification key and the different verification key signature data, and (iv) overwrites the verification key certificate stored in the public key certificate storage unit with the different verification key certificate.

13. A signature verification method used on a signature verification apparatus for performing a verification of signature data generated by a signature generation apparatus which performs a digital signature operation with use of a signature key, the signature verification method comprises:

a reception step of receiving, from the signature generation apparatus, (i) signature target data including message data and a cumulative count of digital signature operations having been performed by the signature generation apparatus and (ii) the signature data which corresponds to the signature target data;

a count judgment step of judging whether the cumulative count has reached a predetermined count; and a verification inhibition step of inhibiting the verification of the signature data in a case where the cumulative count is determined to have reached the predetermined count in the count judgment step wherein the signature target data further includes $1^{st}$ time information used as a standard of judgment for a time limit of validity of the signature data, wherein the signature verification method further comprises:

a clock step of timing;

a time limit judgment step of, in a case where the judgment step determines that the cumulative count has not reached the predetermined count, obtaining $2^{nd}$ time information indicating a current time using the clock step and judging whether the time limit of validity has expired using the $1^{st}$ time information and the $2^{nd}$ time information; and a verification step of verifying the signature data in a case where the time judgment step determines that the time limit of validity has not expired, wherein the verification inhibition step inhibits the verification of the signature data in a case where the time limit judgment step determines that the time limit has expired, wherein the signature data is generated using the signature key generated by the signature generation apparatus, wherein the reception step further receives (i) a verification key certificate including a verification key corresponding to the signature key and verification key signature data indicating authenticity of the verification key and which is generated by a $1^{st}$ private key, and (ii) a public key certificate including a $1^{st}$ public key corresponding to the $1^{st}$ and public key signature data indicating authenticity of the $1^{st}$ public key and which is generated by a $2^{nd}$ private key held by an outside functional entity, wherein the signature verification apparatus includes:

a key storage unit storing therein a $2^{nd}$ public key corresponding to the $2^{nd}$ private key, and wherein the verification step includes:

a $1^{st}$ verification step of, in the case where the time limit judgment step determines that the time limit has expired, performing a verification of authenticity of the public key certificate, using the $2^{nd}$ public key;

a $2^{nd}$ verification step of, in a case where the authenticity of the public key certificate is verified, performing a verification of authenticity of the verification key certificate, using the $1^{st}$ public key; and a $3^{rd}$ verification step of, in a case where the authenticity of the verification key certificate is verified, performing a verification of authenticity of the signature data.

14. A non-transitory computer readable recording medium having stored thereon a signature verification program used on a signature verification apparatus for performing a verification of signature data generated by a signature generation apparatus which performs a digital signature operation with use of a signature key, wherein, when executed, the signature verification program causes the signature generation apparatus to perform a method comprising:

a reception step of receiving, from the signature generation apparatus, (i) signature target data including message data and a cumulative count of digital signature operations having been performed by the signature generation apparatus and (ii) the signature data which corresponds to the signature target data;

a count judgment step of judging whether the cumulative count has reached a predetermined count; and a verification inhibition step of inhibiting the verification of the signature data in a case where the cumulative count is determined to have reached the predetermined count in the count judgment step, wherein the signature target data further includes $1^{st}$ time information used as a standard of judgment for a time limit of validity of the signature data, wherein the signature verification method further comprises:

a clock step of timing;

a time limit judgment step of, in a case where the judgment step determines that the cumulative count has not reached the predetermined count, obtaining $2^{nd}$ time information indicating a current time using the clock step and judging whether the time limit of validity has expired using the $1^{st}$ time information and the $2^{nd}$ time information; and a verification step of verifying the signature data in a case where the time judgment step determines that the time limit of validity has not expired, wherein the verification inhibition step inhibits the verification of the signature data in a case where the time limit judgment step determines that the time limit has expired, wherein the signature data is generated using the signature key generated by the signature generation apparatus, wherein the reception step further receives (i) a verification key certificate including a verification key corresponding to the signature key and verification key signature data indicating authenticity of the verification key and which is generated by a $1^{st}$ private key, and (ii) a public key certificate including a $1^{st}$ public key corresponding to the $1^{st}$ and public key signature data indicating authenticity of the $1^{st}$ public key and which is generated by a $2^{nd}$ private key held by an outside functional entity, wherein the signature verification apparatus includes:
a key storage unit storing therein a $2^{nd}$ public key corresponding to the $2^{nd}$ private key, and wherein the verification step includes:
a $1^{st}$ verification step of, in the case where the time limit judgment step determines that the time limit has expired, performing a verification of authenticity of the public key certificate, using the $2^{nd}$ public key;
a $2^{nd}$ verification step of, in a case where the authenticity of the public key certificate is verified, performing a verification of authenticity of the verification key certificate, using the $1^{st}$ public key; and
a $3^{rd}$ verification step of, in a case where the authenticity of the verification key certificate is verified, performing a verification of authenticity of the signature data.

15. An integrated circuit of a signature generation apparatus for performing a digital signature operation with use of a signature key, comprising:
a key storage unit storing therein the signature key;
a signature generation unit operable to perform the digital signature operation on signature target data with the use of the signature key to generate signature data;
a counter unit operable to count a cumulative count of digital signature operations having been performed by the signature generation unit with the use of the signature key;
a judgment unit operable to judge whether the cumulative count has reached a predetermined count; and
a signature inhibition unit operable to, in a case where the judgment unit determines that the cumulative count has reached the predetermined count, inhibit the use of the signature key in the digital signature operation from then onward, wherein the signature inhibition unit generates a different signature key and overwrites the signature key stored in the key storage unit with the different signature key to inhibit the use of the signature key in the digital signature operation, wherein the integrated circuit further comprises:
a verification key certificate storage unit storing therein a verification key certificate including (i) a verification key corresponding to the signature key and (ii) verification key signature data indicating authenticity of the verification key and which is generated by a $1^{st}$ private key;
a public key certificate storage unit storing therein a public key certificate including (i) a public key corresponding to the $1^{st}$ private key and (ii) public key signature data indicating authenticity of the public key and which is generated by a $2^{nd}$ private key held by an outside functional entity; and
a transmission unit operable to transmit the signature target data, the signature data generated by the signature generation unit, the verification key certificate, and the public key certificate to a signature verification apparatus that performs a verification of the signature data, and wherein the signature inhibition unit, in order to inhibit the use of the signature key in the digital signature operation, (i) generates a different verification key that corresponds to the different signature key, (ii) generates different verification key signature data for the different verification key using the $1^{st}$ private key, (iii) generates a different verification key certificate that includes the different verification key and the different verification key signature data, and (iv) overwrites the verification key certificate stored in the public key certificate storage unit with the different verification key certificate.

16. An integrated circuit of a signature verification apparatus for performing a verification of signature data generated by a signature generation apparatus that performs a digital signature operation with use of a signature key, comprising:
a reception unit operable to receive, from the signature generation apparatus, (i) signature target data including message data and a cumulative count of digital signature operations having been performed by the signature generation apparatus and (ii) the signature data which corresponds to the signature target data;
a count judgment unit operable to judge whether the cumulative count has reached a predetermined count; and
a verification inhibition unit operable to inhibit the verification of the signature data in a case where the count judgment unit determines that the cumulative count has reached the predetermined count wherein the signature target data further includes $1^{st}$ time information used as a standard of judgment for a time limit of validity of the signature data, wherein the integrated circuit further comprises:
a clock unit operable to time;
a time limit judgment unit operable to, in a case where the judgment unit determines that the cumulative count has not reached the predetermined count, obtain $2^{nd}$ time information indicating a current time using the clock unit and judge whether the time limit of validity has expired using the $1^{st}$ time information and the $2^{nd}$ time information; and
a verification unit operable to verify the signature data in a case where the time judgment unit determines that the time limit of validity has not expired, wherein the verification inhibition unit inhibits the verification of the signature data in a case where the time limit judgment unit determines that the time limit has expired, wherein the signature data is generated using the signature key generated by the signature generation apparatus, wherein the reception unit further receives (i) a verification key certificate including a verification key corresponding to the signature key and verification key signature data indicating authenticity of the verification key and which is generated by a $1^{st}$ private key, and (ii) a public key certificate including a $1^{st}$ public key corresponding to the $1^{st}$ public key signature data indicating authenticity of the $1^{st}$ public key and which is generated by a $2^{nd}$ private key held by an outside functional entity, and wherein the verification unit includes:
a key storage unit storing therein a $2^{nd}$ public key corresponding to the $2^{nd}$ private key;
a $1^{st}$ verification unit operable to, in the case where the time limit judgment unit determines that the time limit has expired, perform a verification of authenticity of the public key certificate, using the 2$^{nd}$ public key:, a 2$^{nd}$ verification unit operable to, in a case where the authenticity of the public key certificate is verified, perform a verification of authenticity of the verification key certificate, using the 1$^{st}$ public key; and a 3$^{rd}$ verification unit operable to, in a case where the authenticity of the verification key certificate is verified, perform a verification of authenticity of the signature data.

* * * * *